(12) United States Patent
Konno et al.

(10) Patent No.: US 7,624,638 B2
(45) Date of Patent: Dec. 1, 2009

(54) ELECTROSTATIC CAPACITANCE TYPE ACCELERATION SENSOR

(75) Inventors: Nobuaki Konno, Chiyoda-ku (JP); Yoshiaki Hirata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 95 days.

(21) Appl. No.: 11/933,685

(22) Filed: Nov. 1, 2007

(65) Prior Publication Data
US 2008/0110260 A1    May 15, 2008

(30) Foreign Application Priority Data

| Nov. 9, 2006 | (JP) | ............................. 2006-303838 |
| Aug. 30, 2007 | (JP) | ............................. 2007-224102 |

(51) Int. Cl.
*G01P 15/125* (2006.01)
*G01P 15/08* (2006.01)

(52) U.S. Cl. .................................. 73/514.32; 73/514.18

(58) Field of Classification Search .............. 73/514.32, 73/514.29, 514.16, 514.17, 514.18, 514.36, 73/514.38, 514.21
See application file for complete search history.

(56) References Cited

U.S. PATENT DOCUMENTS

| 4,699,006 | A |  | 10/1987 | Boxenhorn |  |
| 4,736,629 | A |  | 4/1988 | Cole |  |
| 5,220,835 | A | * | 6/1993 | Stephan | .................... 73/514.32 |
| 5,488,864 | A | * | 2/1996 | Stephan | .................... 73/514.32 |
| 6,467,345 | B1 | * | 10/2002 | Neukermans et al. | .... 73/504.02 |
| 6,494,094 | B1 | * | 12/2002 | Tsugai et al. | ............ 73/504.12 |
| 6,543,286 | B2 | * | 4/2003 | Garverick et al. | ......... 73/514.18 |
| 6,955,086 | B2 |  | 10/2005 | Yoshikawa et al. |  |

FOREIGN PATENT DOCUMENTS

JP        5-133976        5/1993

* cited by examiner

*Primary Examiner*—Helen C. Kwok
(74) *Attorney, Agent, or Firm*—Oblon, Spivak, McClelland, Maier & Neustadt, L.L.P.

(57) ABSTRACT

First and second detection frames are supported by a substrate to be rotatable about first and second torsion axes. A first link beam is connected to the first detection frame on an axis located at a position moved from a position of the first torsion axis in a first direction crossing the first torsion axis and directed to one end side of the first detection frame. A second link beam is connected to the second detection frame on an axis located at a position shifted from a position of the second torsion axis in a second direction opposite to the first direction. An inertia mass body is displaceable in a thickness direction of the substrate by being linked with the first and second detection frames by the first and second link beams, respectively. This constitution makes it possible to obtain a highly precise acceleration sensor hardly influenced by disturbances.

9 Claims, 16 Drawing Sheets

ELECTROSTATIC CAPACITANCE TYPE ACCELERATION SENSOR

BACKGROUND OF THE INVENTION

1. Field of the Invention

The present invention relates to an acceleration sensor, and more particularly to an electrostatic capacitance type acceleration sensor.

2. Description of the Background Art

As one of the principles of a conventional acceleration sensor for detecting acceleration in the substrate thickness direction, there is a method for detecting a change in electrostatic capacitance in accordance with the acceleration. As an acceleration sensor based on this method, there is proposed in Japanese Patent Laid-Open No. 05-133976 (page 16, FIGS. 23 and 24) an acceleration sensor including, for example, a torsion beam, an inertia mass body, a detection frame, and a detection electrode as main components.

The acceleration sensor includes one detection frame having a surface facing a substrate. The inertia mass body is provided on one end part of the detection frame. Further, the detection frame is supported on the substrate so as to be rotatable with the torsion beam as the axis of rotation. Further, the detection electrode for detecting this rotational displacement is provided under the detection frame.

When acceleration in the substrate thickness direction is applied to the acceleration sensor constituted as described above, inertia force in the substrate thickness direction acts on the inertia mass body. Since the inertia mass body is provided on the one end part, that is, at a position deviated from the axis of rotation in the substrate in-plane direction, this inertia force acts on the detection frame as a torque around the torsion beam. As a result, the detection frame is rotationally displaced.

The distance between the detection frame and the detection electrode is changed by this rotational displacement, which causes electrostatic capacitance formed by the detection frame and the detection electrode to be changed. The acceleration is measured from this change in electrostatic capacitance.

Gravity always acts downward on the inertia mass body. Thereby, the inertia mass body is in the state of being displaced downward from the axis of rotation of the detection frame.

When acceleration in the substrate in-plane direction and in a direction crossing the axis of rotation is applied to the acceleration sensor in this state, the point where the inertia force acts on the detection frame is positioned lower than the axis of rotation. Further, this inertia force has a component orthogonal to the axis of rotation. As a result, the detection frame is rotationally displaced by receiving torque around the axis of rotation. That is, also when acceleration along an axis other than the axis as the object to be detected by the acceleration sensor is applied, the detection frame is rotationally displaced.

Further, also when angular acceleration around the torsion beam is applied to the acceleration sensor, the detection frame is rotated by the inertia force applied to the inertia mass body.

Further, also when angular velocity is applied to the acceleration sensor, the detection frame may be rotated under the influence of centrifugal force applied to the inertia mass body.

In the above described conventional acceleration sensor, the rotation of the detection frame due to acceleration of other axis, angular acceleration, and angular velocity cannot be distinguished from the rotation of the detection frame due to acceleration in the substrate thickness direction which is the object to be detected. Therefore, there is a problem that the detection error of acceleration is increased.

SUMMARY OF THE INVENTION

The present invention has been made in view of the above described problem. An object of the present invention is to provide a highly precise acceleration sensor which is hardly influenced by acceleration of other axis, angular acceleration, and angular velocity.

The acceleration sensor according to the present invention includes a substrate, first and second torsion beams, first and second detection frames, a plurality of detection electrodes, first and second link beams, and an inertia mass body.

The first torsion beam can be distorted around a first torsion axis, and is supported by the substrate. The first detection frame is supported by the substrate with the first torsion beam so as to be rotatable about the first torsion axis. The second torsion beam can be distorted around a second torsion axis, and is supported by the substrate. The second detection frame is supported by the substrate with the second torsion beam so as to be rotatable about the second torsion axis. The plurality of detection electrodes are provided for detecting an angle formed between the substrate and each of the first and second detection frames on the basis of electrostatic capacitance, and are formed on the substrate so as to face each of the first and second detection frames. The first link beam is connected to the first detection frame on an axis located at a position moved from a position of the first torsion axis in a first direction crossing the first torsion axis and directed to one end side of the first detection frame. The second link beam is connected to the second detection frame on an axis located at a position shifted from a position of the second torsion axis in a second direction opposite to the first direction. The inertia mass body is supported above the substrate so as to be displaceable in a thickness direction of the substrate by being connected to the first and second detection frames by the first and second link beams, respectively.

According to the acceleration sensor of the present invention, the first link beam is connected to the first detection frame on the axis located at a position moved from the position of the first torsion axis in a direction crossing the first torsion axis and directed to one end side of the first detection frame. On the other hand, the second link beam is connected to the second detection frame on the axis located at a position shifted from the position of the second torsion axis in a direction opposite to the direction described above.

For this reason, when the inertia mass body is displaced in the thickness direction of the substrate, the first and second detection frames are rotationally displaced in the directions opposite to each other, while when the inertia mass body is inclined or displaced in the in-plane direction of the substrate, the first and second detection frames are rotationally displaced in the same direction.

Therefore, by providing the detection electrodes in such a manner that the sensitivity thereof can be increased only when the first and second detection frames are rotationally displaced in the directions opposite to each other, it is possible to suppress the sensitivity to acceleration in the directions other than the direction to be detected, and to suppress the influence of angular velocity or angular acceleration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, embodiments according to the present invention will be described with reference to the drawings.

Embodiment 1

First, a main constitution of an acceleration sensor according to the present embodiment is explained.

Figure 1:
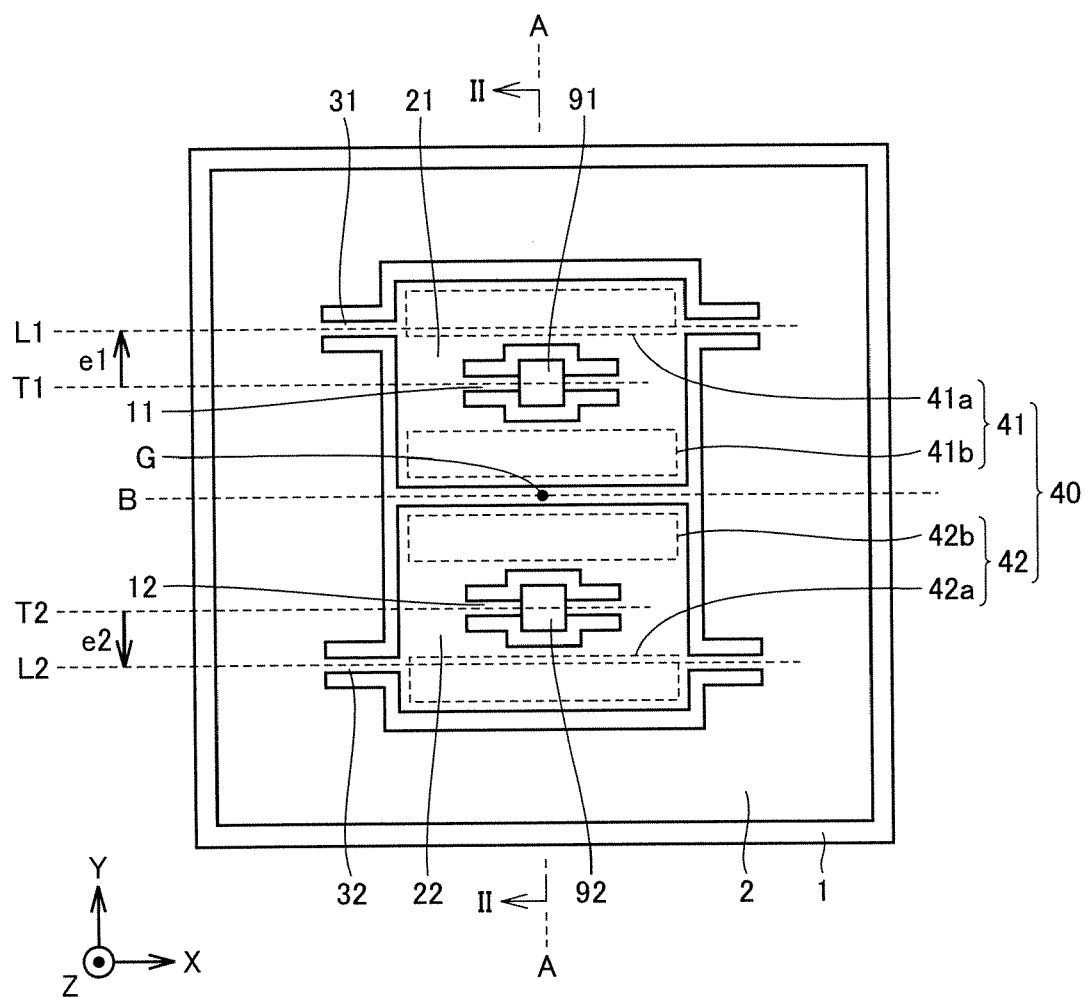
FIG. 1 is a top view schematically showing a constitution of an acceleration sensor according to Embodiment 1 of the present invention.
Figure 2:
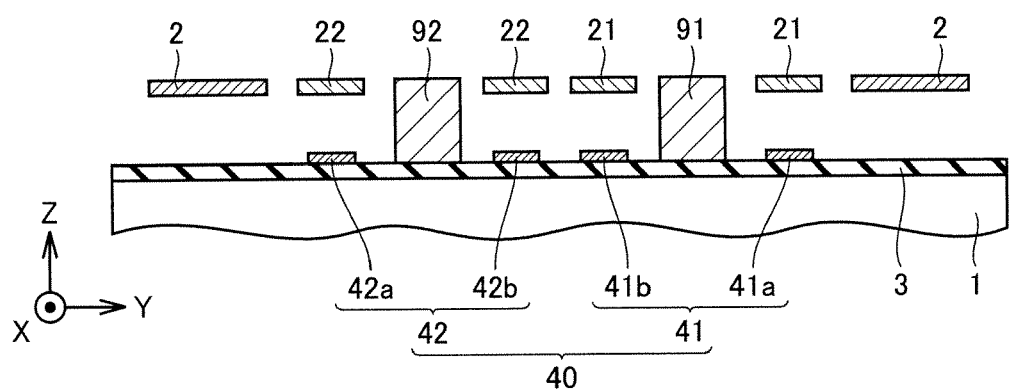
FIG. 2 is a schematic cross-sectional view along line II-II in FIG. 1.

Referring to FIGS. 1 and 2, the coordinate axes of the X axis, the Y axis and the Z axis are introduced for convenience of explanation. In FIG. 1, the X axis is an axis in which the right direction along the lateral direction is the positive direction, the Y axis is an axis in which the upper direction along the longitudinal direction is the positive direction, and the Z axis is an axis which is vertical to the paper surface and in which the upper direction is the positive direction. Note that the direction of the Z axis coincides with the acceleration direction to be measured by the acceleration sensor according to the present embodiment.

The acceleration sensor according to the present embodiment mainly includes a substrate 1, first and second torsion beams 11 and 12, first and second detection frames 21 and 22, a plurality of detection electrodes 40, first and second link beams 31 and 32, and an inertia mass body 2.

A silicon substrate can be used as substrate 1. Further, a polysilicon film can be used as a material of first and second torsion beams 11 and 12, first and second detection frames 21 and 22, first and second link beams 31 and 32, inertia mass body 2, and detection electrodes 40. It is preferred that the polysilicon film has low stress and no stress distribution in the thickness direction thereof.

First torsion beam 11 is supported by substrate 1 with an anchor 91 so as to be distortionable around a first torsion axis T1 along the X axis.

First detection frame 21 is supported by substrate 1 with first torsion beam 11 so as to be rotatable about first torsion axis T1. Further, at least a part of first detection frame 21 has conductivity.

Second torsion beam 12 is supported by substrate 1 with an anchor 92 so as to be distortionable around a second torsion axis T2 along the X axis.

Second detection frame 22 is supported by substrate 1 with second torsion beam 12 so as to be rotatable about second torsion axis T2. Further, at least a part of second detection frame 22 has conductivity.

The plurality of detection electrodes 40 are formed on substrate 1 with an insulating film 3 interposed therebetween so as to face each of first and second detection frames 21 and 22, in order to enable an angle formed between substrate 1 and each of first and second detection frames 21 and 22 to be detected on the basis of electrostatic capacitance. Note that a silicon nitride film or a silicon oxide film having low stress is preferably used as insulating film 3.

First link beam 31 is connected to first detection frame 21 on an axis L1 which is located at a position moved in parallel from a position of first torsion axis T1 by an offset e1 in a first direction crossing first torsion axis T1 and directed to one end side of first detection frame 21. That is, the absolute value of offset e1 is a dimension between first torsion axis T1 and first link beam 31, and the direction of the offset is the direction crossing first torsion axis T1 and directed from first torsion axis T1 to axis L1.

Second link beam 32 is connected to second detection frame 22 on an axis L2 which is located at a position shifted in parallel from a position of second torsion axis T2 by an offset e2 in a second direction opposite to the first direction, that is, a direction opposite to the direction of offset e1. That is, the absolute value of offset e2 is a dimension between second torsion axis T2 and second link beam 32, and the direction of offset e2 is opposite to the direction of offset e1.

Inertia mass body 2 is supported above substrate 1 so as to be displaceable in the thickness direction of substrate 1, by being connected to first and second detection frames 21 and 22 by first and second link beams 31 and 32, respectively.

Subsequently, details of constitution of detection electrode 40 as described above, and the principle to detect the angle between substrate 1 and each of first and second detection frames 21 and 22 are explained.

Detection electrode 40 has a first detection electrode 41 facing first detection frame 21. First detection electrode 41 has first detection electrodes 41a and 41b so as to sandwich first torsion axis T1 therebetween. First detection electrode 41a is positioned on the outer peripheral side (upper side in FIG. 1) of the acceleration sensor, and first detection electrode 41b is positioned on the inner peripheral side (central side in FIG. 2) of the acceleration sensor. First detection electrodes 41a and 41b are provided so as to sandwich first torsion axis T1 therebetween.

When first detection frame 21 is rotated around first torsion beam 11, the rear surface (surface facing first detection electrode 41) of first detection frame 21 approaches one of first detection electrodes 41a and 41b and recedes from the other first detection electrode. Thus, it is possible to detect an angle between first detection frame 21 and substrate 1 by detecting a difference between electrostatic capacitance formed by making first detection frame 21 face first detection electrode 41a and electrostatic capacitance formed by making first detection frame 21 face first detection electrode 41b.

Detection electrode 40 has a second detection electrode 42 facing second detection frame 22. Second detection electrode 42 has second detection electrodes 42a and 42b so as to sandwich second torsion axis T2 therebetween. Second detection electrode 42a is positioned on the outer peripheral side (lower side in FIG. 1) of the acceleration sensor, and second detection electrode 42b is positioned on the inner peripheral side (central side in FIG. 1) of the acceleration sensor. Second detection electrodes 42a and 42b are formed so as to sandwich second torsion axis T2 therebetween.

When second detection frame 22 is rotated around second torsion beam 12, the rear surface (surface facing second detection electrode 42) of second detection frame 22 approaches one of second detection electrodes 42a and 42b and recedes from the other second detection electrode. Thus, it is possible to detect an angle between second detection frame 22 and substrate 1 by detecting a difference between electrostatic capacitance formed by making second detection frame 22 face second detection electrode 42a and electrostatic capacitance formed by making second detection frame 22 face second detection electrode 42b.

Preferably, first and second torsion beams 11 and 12, and first and second link beams 31 and 32 are respectively arranged so that offsets e1 and e2 are directed to directions opposite to each other and have an equal amount in each direction.

Even more preferably, the plane layout of the acceleration sensor has a constitution which is line symmetrical to a center line B extended in the direction in parallel with first and second torsion axes T1 and T2, and in which the center of gravity G of inertia mass body 2 is positioned on center line B.

Further, the plane layout of the acceleration sensor has a constitution which is line symmetrical to a center line A extended in the direction crossing first and second torsion axes T1 and T2, and in which the center of gravity G of inertia mass body 2 is positioned on center line A.

Subsequently, a measuring principle of acceleration of the acceleration sensor according to the present embodiment is explained.

Figure 3:
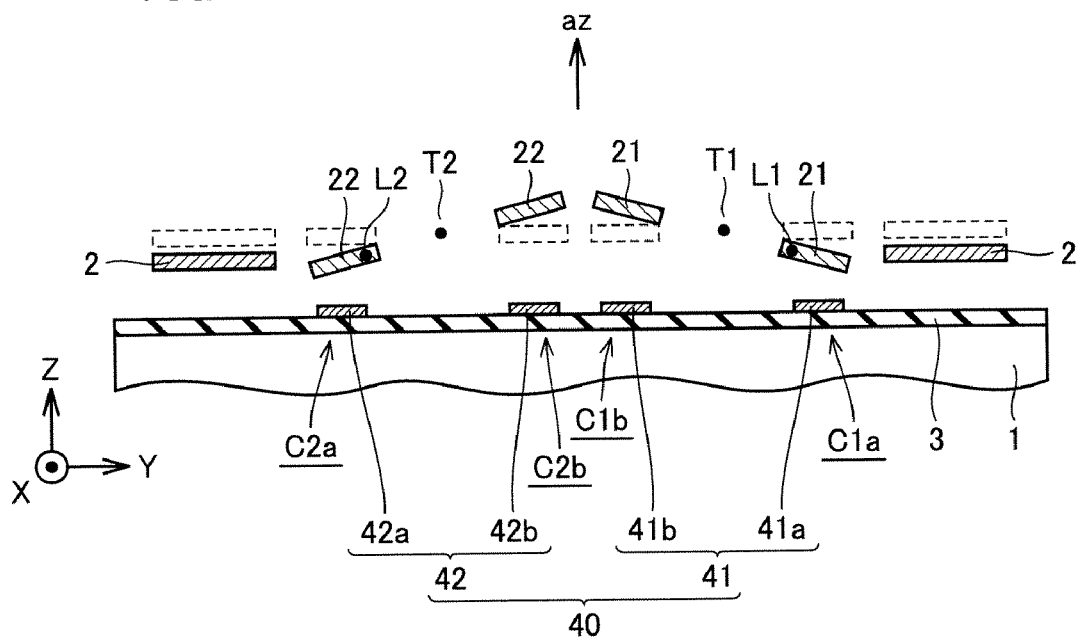
FIG. 3 is a cross-sectional view which schematically shows a state where acceleration is applied upward along the film thickness direction of the substrate to the acceleration sensor according to Embodiment 1 of the present invention, and whose cross-sectional position corresponds to the cross-sectional position in FIG. 2, and in which anchors are not shown for the sake of clarity.

Referring to FIG. 3, when acceleration az in the upward direction along the film thickness direction of substrate, that is, in the positive direction (upward direction in the figure) of the Z axis is applied, inertia mass body 2 is displaced by the inertia force so as to be sunk in the negative direction (downward direction in the figure) of the Z axis from an initial position (position shown by broken line). First and second link beams 31 and 32 which are linked with inertia mass body 2 are also displaced integrally with the inertia mass body in the negative direction (downward direction in the figure) of the Z axis.

Due to the displacement of first link beam 31, first detection frame 21 receives force in the negative direction (downward direction in the figure) of the Z axis by a part of axis L1. Axis L1 is located on the position shifted by the parallel movement by offset e1 from first torsion axis T1, which causes torque to act on first detection frame 21. As a result, first detection frame 21 is rotationally displaced.

Further, due to the displacement of second link beam 32, second detection frame 22 receives force in the negative direction (downward direction in the figure) of the Z axis by a part of axis L2. Axis L2 is located on the position shifted by the parallel movement by offset e2 from second torsion axis T2, which causes torque to act on second detection frame 22. As a result, second detection frame 22 is rotationally displaced.

Since offsets e1 and e2 are directed in the opposite directions to each other, first detection frame 21 and second detection frame 22 are rotated reversely to each other. That is, first and second detection frames 21 and 22 are rotationally displaced in such a manner that the upper surface of first detection frame 21 is directed toward one end side (right-hand side in FIG. 3) of the acceleration sensor, and the upper surface of second detection frame 22 is directed toward the other end side (left-hand side in FIG. 3) of the acceleration sensor.

In accordance with this rotational displacement, electrostatic capacitance $C_{1a}$ of capacitor C1a formed by first detection frame 21 and first detection electrode 41a is increased, and electrostatic capacitance $C_{1b}$ of capacitor C1b formed by first detection frame 21 and first detection electrode 41b is decreased. Further, electrostatic capacitance $C_{2a}$ of capacitor C2a formed by second detection frame 22 and second detection electrode 42a is increased, and electrostatic capacitance $C_{2b}$ of capacitor C2b formed by second detection frame 22 and second detection electrode 42b is decreased.

Figure 4:
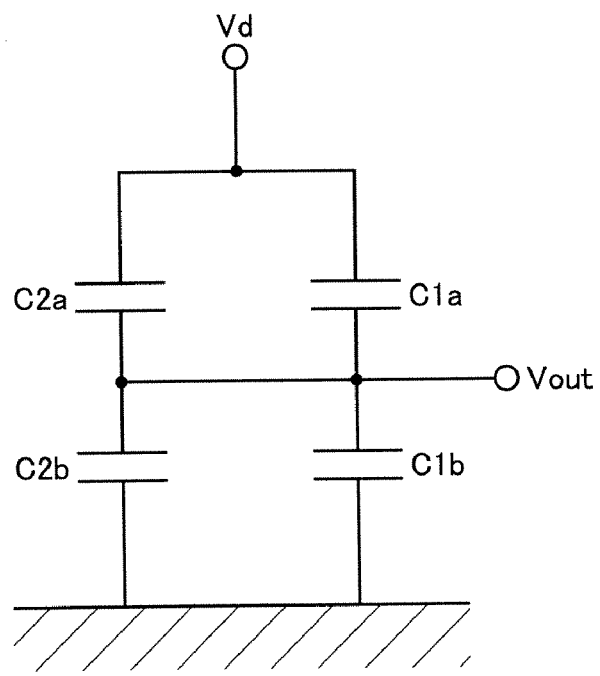
FIG. 4 is a circuit diagram explaining an electrical connection between capacitors formed by first and second detection frames and detection electrodes of the acceleration sensor according to Embodiment 1 of the present invention.

Referring to FIG. 4, capacitors C1a and C2a are connected in parallel, and capacitors C1b and C2b are connected in parallel. Then, the two parallel connection parts are further connected in series. A constant potential $V_d$ is applied to the end part on the side of capacitors C1a and C2a of the circuit formed in this way, and the end part on the side of capacitors C1b and C2b is grounded. The above described series connection part is provided with a terminal, whose output potential $V_{out}$ can be measured. Output potential $V_{out}$ takes a value obtained from the following formula.

$$V_{out} = \frac{C_{1a} + C_{2a}}{(C_{1a} + C_{2a}) + (C_{1b} + C_{2b})} V_d \quad (1)$$

Since constant potential $V_d$ is fixed to a constant value, a value of the following formula can be obtained by measuring output potential $V_{out}$.

$$\frac{C_{1b} + C_{2b}}{C_{1a} + C_{2a}} = \frac{V_d}{V_{out}} - 1 \quad (2)$$

The value of formula (2) is decreased, when inertia mass body 2 is sunk as shown in FIG. 3. Further, when the acceleration in the direction opposite to the direction of acceleration az (FIG. 3) is applied to the acceleration sensor, inertia mass body 2 is displaced in the upward direction along the thickness direction of substrate 1, so as to increase the value of formula (2). As a result, the displacement of inertia mass body 2 in the thickness direction of substrate 1 is detected by measuring output potential $V_{out}$, so that acceleration az in the Z axis direction can be detected from this detection.

Next, examples when movements other than the acceleration in the Z direction are applied to the acceleration sensor according to the present embodiment are explained.

Figure 5:
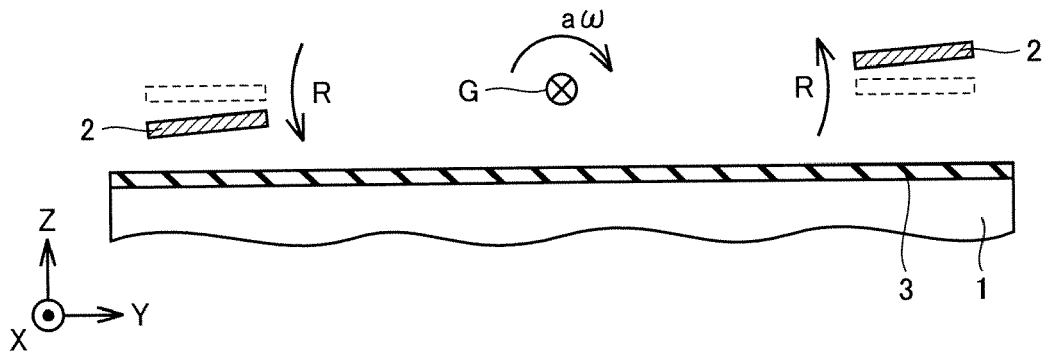
FIG. 5 is a sectional view which schematically shows a state where negative angular acceleration around the X axis is applied to the center of gravity of an inertia mass body of the acceleration sensor according to Embodiment 1 of the present invention, whose cross-sectional position is the same as in FIG. 2, and in which the first and second detection frames, anchors, and detection electrodes are not shown for the sake of clarity.

Referring to FIG. 5, when inertia mass body 2 receives negative angular acceleration ac in the X axis direction around its center of gravity G, inertia mass body 2 is inclined by being rotationally displaced by the moment of inertia thereof in the direction (the direction of arrow R in the figure) opposite to the angular acceleration aω from the initial position (position shown by broken lines in the figure).

Figure 6:
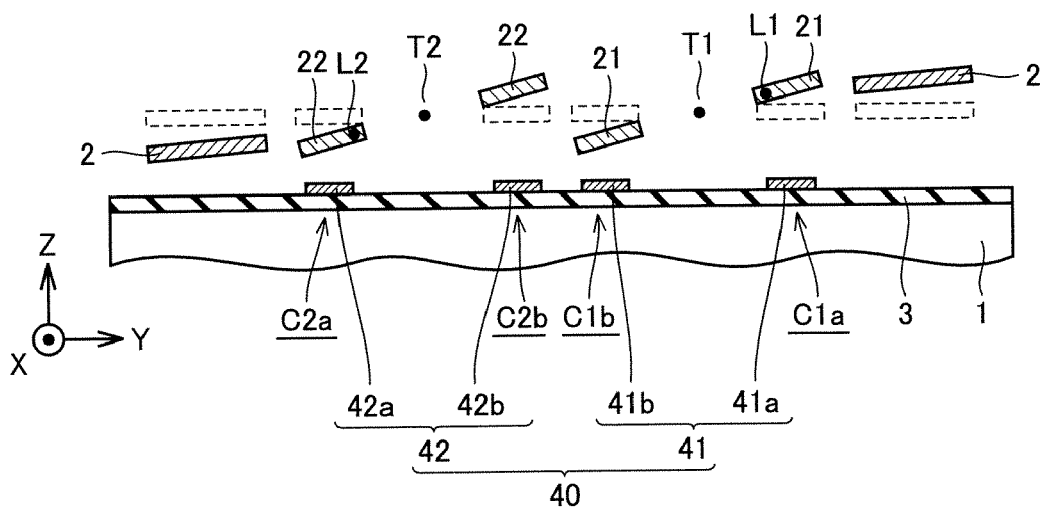
FIG. 6 is a sectional view which schematically shows a state where negative angular acceleration around the X axis is applied to the center of gravity of an inertia mass body of the acceleration sensor according to Embodiment 1 of the present invention, whose cross-sectional position is the same as in FIG. 2, and in which anchors are not shown for the sake of clarity.

Referring to FIG. 6, in accordance with the inclination of inertia mass body 2, first detection frame 21 is raised by the part of axis L1 of first link beam 31 so as to be rotated about first torsion axis T1, while second detection frame 22 is pressed down by the part of axis L2 of second link beam 32 so as to be rotated about second torsion axis T2.

In accordance with the rotation of first and second detection frames 21 and 22, electrostatic capacitance $C_{1a}$ of capacitor C1a formed by first detection frame 21 and first detection electrode 41a is decreased, and electrostatic capacitance $C_{1b}$ of capacitor C1b formed by first detection frame 21 and first detection electrode 41b is increased. Further, electrostatic capacitance $C_{2a}$ of capacitor C2a formed by second detection frame 22 and second detection electrode 42a is increased, and electrostatic capacitance $C_{2b}$ of capacitor C2b formed by second detection frame 22 and second detection electrode 42b is decreased.

Referring to formula (2), when the above described changes in the electrostatic capacitance are caused, in the left side denominator, the decrease of electrostatic capacitance $C_{1a}$ and the increase of $C_{2a}$ are mutually canceled, and in the left side numerator, the increase of $C_{1b}$ and the decrease of $C_{2b}$ are mutually canceled. For this reason, the influence of the angular acceleration aω on output potential $V_{out}$ is suppressed.

Figure 7:
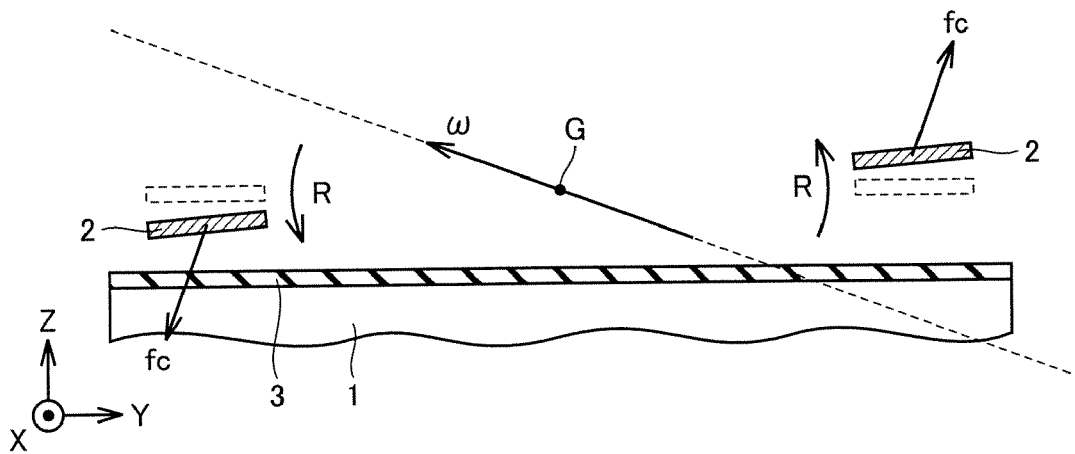
FIG. 7 is a figure which shows a state where angular velocity having a positive component in the Z axis direction and a negative component in the Y axis direction is applied to the center of gravity of the inertia mass body according to Embodiment 1 of the present invention, and in which the first and second detection frames, anchors, and detection electrodes are not shown for the sake of clarity.

Referring to FIG. 7, when angular velocity ω having a positive component in the Z axis direction and a negative component in the Y axis direction is applied around the center of gravity of inertia mass body 2 of the acceleration sensor, centrifugal force fc acts on inertia mass body 2. Thereby, the end of inertia mass body 2 is rotationally displaced from the initial position (position shown by broken lines in the figure) in the direction (the direction of arrow R in the figure) away from the axis of rotation of angular velocity ω, so that inertia mass body 2 is inclined.

The inclination of inertia mass body 2 is the same as that of the above described case where angular acceleration aω is applied. For this reason, the influence of angular velocity ω on output potential $V_{out}$ is also suppressed on the basis of the same principle.

Next, detection error when acceleration of other axis is applied to the acceleration sensor according to the present embodiment is explained including the influence of gravity.

Figure 8:
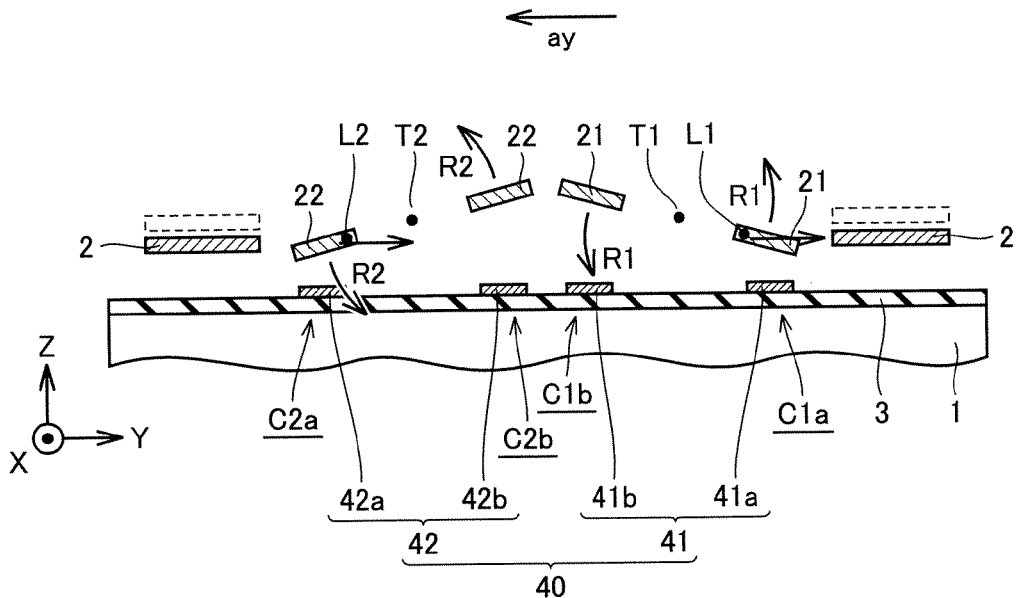
FIG. 8 is a cross-sectional view which schematically shows a state where angular velocity having a positive component in the Z axis direction and a negative component in the Y axis direction is applied to the center of gravity of an inertia mass body of the acceleration sensor according to Embodiment 1 of the present invention, whose cross-sectional position is the same as in FIG. 2, and in which the first and the second detection frame, anchors, and detection electrodes are not shown for the sake of clarity.

Referring to FIG. 8, negative force in the Z axis direction acts as gravity on inertia mass body 2, so that inertia mass body 2 is in a state of being sunk downward (in the negative direction of the Z axis in the figure) from the initial position (position shown by broken lines in the figure).

In this state, when acceleration ay is applied to the acceleration sensor in the negative direction of the Y axis, inertia force in the positive direction of the Y axis is applied to inertia mass body 2. This inertia force is transmitted to first and second detection frames 21 and 22 by the parts on axes L1 and L2 of first and second link beams 31 and 32, respectively.

The height of axis L1 from substrate 1 is made smaller than that of first torsion axis T1 due to the influence of gravity. For this reason, the above described force transmitted to the part of axis L1 acts on first detection frame 21 as torque around first torsion axis T1.

Further, the height of axis L2 from substrate 1 is made smaller than that of second torsion axis T2 due to the influence of gravity. For this reason, the above described force transmitted to the part of axis L2 acts on second detection frame 22 as torque around second torsion axis T2.

Here, both the above described torques around first and second torsion axes T1 and T2 have action points below first and second torsion axes T1 and T2. Further, the force acting on both of the action points is directed in the positive direction of the Y axis direction. As a result, a rotational displacement R1 of first detection frame 21 and a rotational displacement R2 of second detection frame 22 are directed in the same direction.

Due to the influence of rotational displacement R1, electrostatic capacitance $C_{1a}$ of capacitor C1a formed by first detection frame 21 and first detection electrode 41a is decreased, and electrostatic capacitance $C_{1b}$ of capacitor C1b formed by first detection frame 21 and first detection electrode 41b is increased. Further, due to influence of rotational displacement R, electrostatic capacitance $C_{2a}$ of capacitor C2a formed by second detection frame 22 and second detection electrode 42a is increased, and electrostatic capacitance $C_{2b}$ of capacitor C2b formed by second detection frame 22 and second detection electrode 42b is decreased.

Referring to formula (2), when the changes in the above described electrostatic capacitances are caused, the decrease of electrostatic capacitance $C_{1a}$ and the increase of electrostatic capacitance $C_{2a}$ are mutually canceled in the left side denominator, and the increase of electrostatic capacitance $C_{1b}$ and the decrease of electrostatic capacitance $C_{2b}$ are mutually canceled in the left side numerator. For this reason, the influence of acceleration ay in the Y axis direction on output potential $V_{out}$ measured for detecting acceleration in the Z axis direction is suppressed.

Subsequently, a method for manufacturing the acceleration sensor according to the present embodiment is explained with reference to FIGS. 9 to 13.

Figure 9:
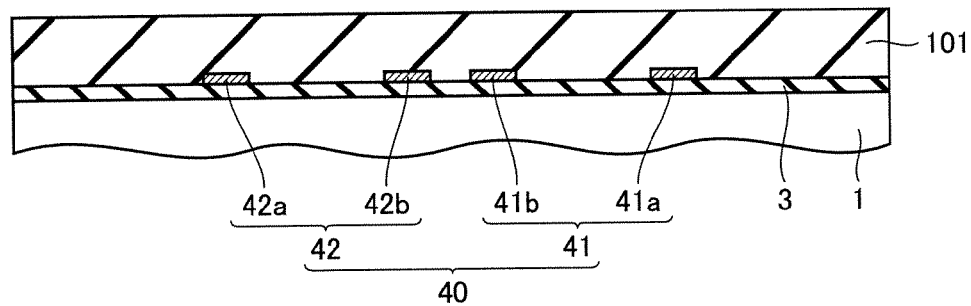
FIGS. 9 to 13 are schematic sectional views which show first to fifth steps of a method for manufacturing the acceleration sensor according to Embodiment 1 of the present invention, and whose cross-sectional position corresponds to the cross-sectional position in FIG. 2.

Referring to FIG. 9, insulating film 3 is deposited on substrate 1 made of silicon by the LPCVD (Low Pressure Chemical Vapor Deposition) method. As insulating film 3, a silicon nitride film, a silicon oxide film and the like which have low stress are suitably used. On insulating film 3, an electroconductive film made of, for example, poly-silicon is deposited by the LPCVD method. Subsequently, the electroconductive film is patterned so that detection electrode 40 is formed. Then, a PSG (Phosphosilicate Glass) film 101 is deposited on the whole surface of substrate 1.

Figure 10:
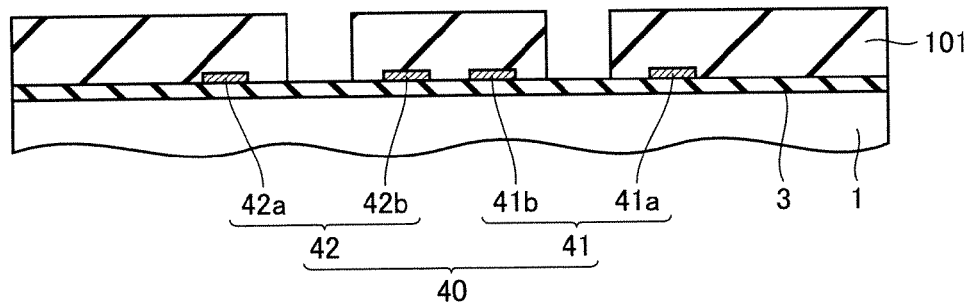

Referring mainly to FIG. 10, a part of PSG film 101 in which anchors 91 and 92 (FIG. 2) are formed is selectively removed.

Figure 11:
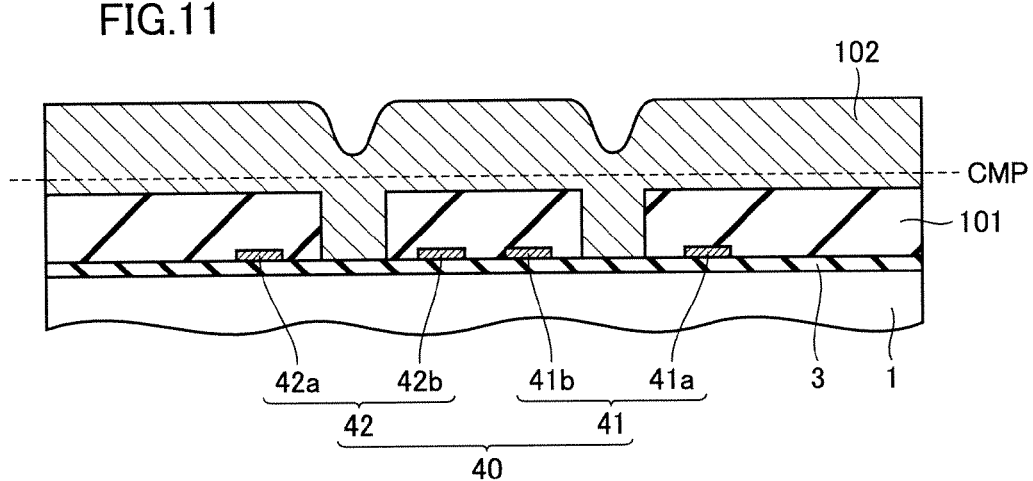

Referring to FIG. 11, a polysilicon film 102 is deposited on the whole surface of substrate 1. Subsequently, CMP (Chemical Mechanical Polishing) processing is performed to the surface of polysilicon film 102.

Figure 12:
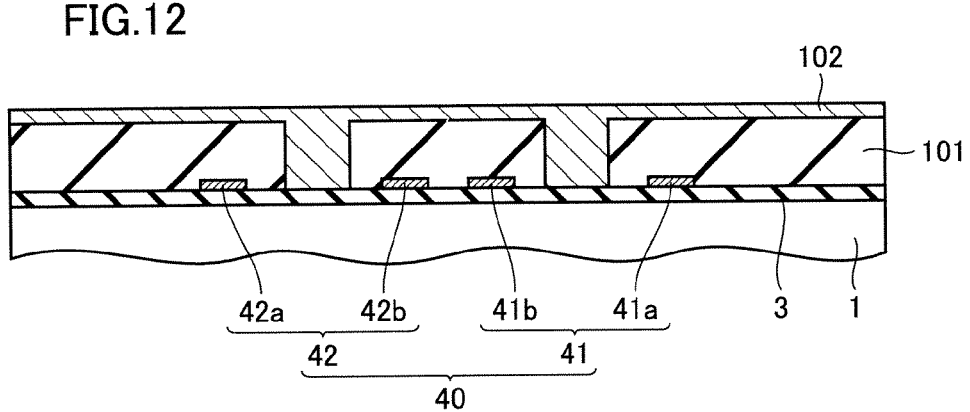

Referring to FIG. 12, the surface of polysilicon film 102 is flattened by the above described CMP processing.

Figure 13:
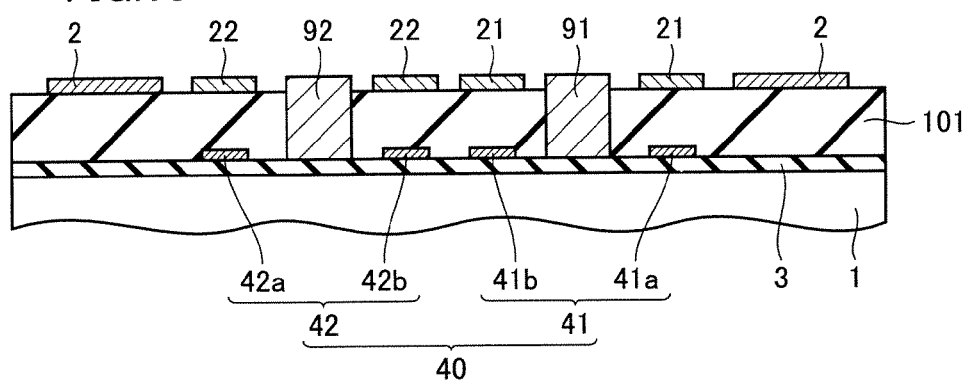

Referring to FIG. 13, selective etching is performed to the part of polysilicon film 102 on the surface of PSG film 101. Thereby, inertia mass body 2, first and second link beams 31 and 32, first and second detection frames 21 and 22, first and second torsion beams 11 and 12, and anchors 91 and 92 are collectively formed. Then, PSG film 101 is removed by etching, and the acceleration sensor according to the embodiment shown in FIG. 2 is obtained.

According to the present embodiment, as shown in FIG. 1, the acceleration sensor has a plane layout in which offsets e1 and e2 are directed in directions opposite to each other. Thereby, when angular acceleration aω is applied to the acceleration sensor as shown in FIG. 5, the changes in electrostatic capacitance between capacitors C1a and C2a and between capacitors C1b and C2b in the electrical circuit shown in FIG. 4 are mutually canceled. As a result, the variation in the value shown by formula (2) is suppressed. That is, the influence of angular acceleration aω on output potential $V_{out}$ can be suppressed. Therefore, when acceleration az is detected on the basis of output potential $V_{out}$, it is possible to prevent a detection error from being caused by angular acceleration aω.

Further, also when angular velocity ω is applied to the acceleration sensor as shown in FIG. 7, the changes in the electrostatic capacitance can be mutually canceled similarly to the above described case where the angular acceleration aω is applied, so that the variation in the value shown by formula (2) is suppressed. That is, the influence of angular velocity ω on output potential $V_{out}$ can be suppressed. Therefore, when acceleration az is detected on the basis of output potential $V_{out}$, it is possible to prevent a detection error from being caused by angular acceleration ω.

Further, also when acceleration ay in the direction other than the film thickness direction of substrate 1 is applied to the acceleration sensor as shown in FIG. 8, the changes in the electrostatic capacitance can be mutually canceled similarly to the cases where the angular acceleration aω and angular velocity ω are applied, so that the variation in the value shown by formula (2) is suppressed. That is, the influence of acceleration ay in the direction other than the thickness direction of substrate 1 as the object to be measured on output potential $V_{out}$ can be suppressed. Therefore, when acceleration az in the thickness direction of the substrate is detected on the basis of output potential $V_{out}$, it is possible to prevent a detection error from being caused by acceleration ay in the other direction.

Further, as shown in FIGS. 12 and 13, inertia mass body 2 serving as a movable part, first and second link beams 31 and 32, first and second detection frames 21 and 22, and first and second torsion beams 11 and 12 are collectively formed from a film made of a same material. Therefore, since there is no joint part of different materials in the movable part, no distortion is generated due to the difference in the thermal expansion coefficients of the different materials. This makes it possible to suppress the temperature dependence of the acceleration sensor.

In the present embodiment, offsets e1 and e2 shown in FIG. 1 are preferably arranged to have absolute values equal to each other. Further, first and second torsion axes T1 and T2 shown in FIG. 1 are arranged to be in parallel with each other. Thereby, when inertia mass body 2 is inclined as shown by arrow R in FIG. 5, amounts of rotational displacement of first and second detection frames 21 and 22 are made equal to each other, as shown in FIG. 6. Thus, the changes in electrostatic capacitance of capacitors C1a, C1b, C2a and C2b shown in FIG. 4 are mutually canceled more accurately. This enables the error of the acceleration sensor to be further suppressed.

Embodiment 2

Figure 14:
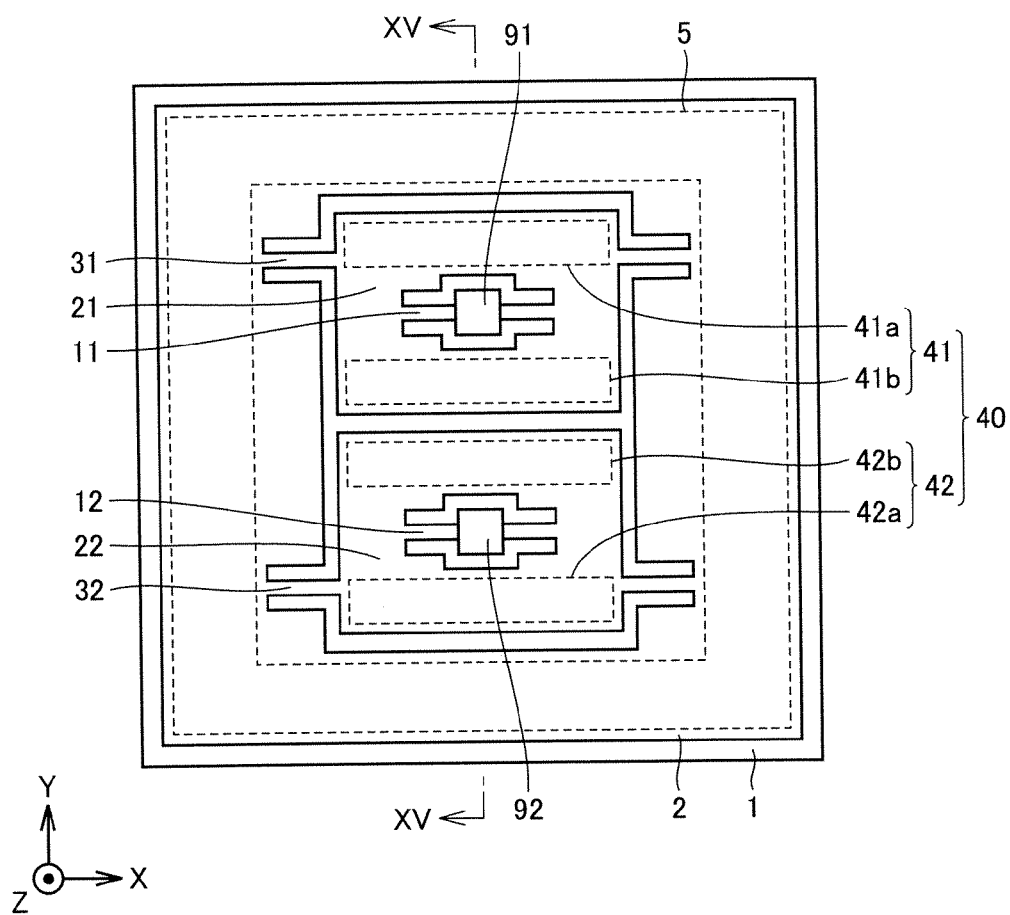
FIG. 14 is a top view schematically showing a constitution of an acceleration sensor according to Embodiment 2 of the present invention.
Figure 15:
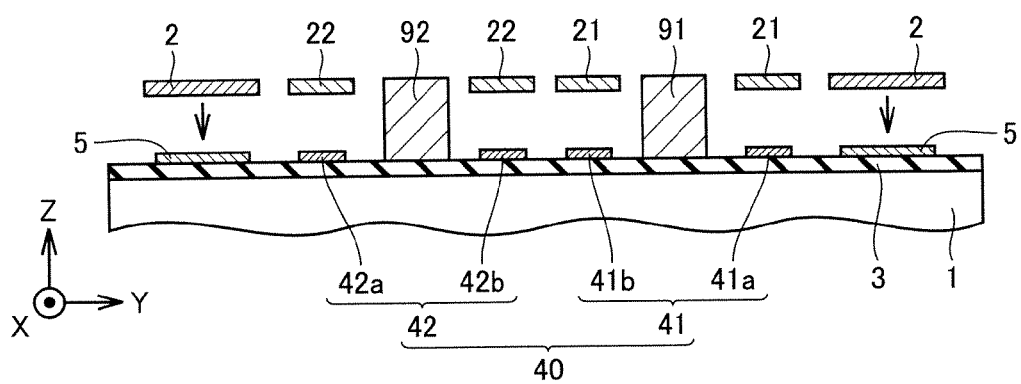
FIG. 15 is a sectional view along line XV-XV in FIG. 14.

Referring to FIGS. 14 and 15, in an acceleration sensor according to the present embodiment, an actuation electrode 5 is formed on substrate 1 so as to face inertia mass body 2.

Note that since the constitution other than this part is the same as the above described constitution of Embodiment 1, the same components are denoted by the same reference numerals and characters, and the explanation of the components is omitted.

According to the present embodiment, as shown by the arrow shown in FIG. 15, electrostatic force pulling inertia mass body 2 toward substrate 1 can be generated by applying a voltage between actuation electrode 5 and inertia mass body 2. That is, inertia mass body 2 can be electrostatically driven in the film thickness direction of substrate 1. This electrostatic drive makes it possible to generate the displacement of inertia mass body 2 equivalent to the displacement in the case where acceleration az in the film thickness direction of substrate 1 is applied to the acceleration sensor. Thus, a function of self-diagnosing whether or not the acceleration sensor is defective without actually applying acceleration az to the sensor can be imparted to the acceleration sensor.

Embodiment 3

Figure 16:
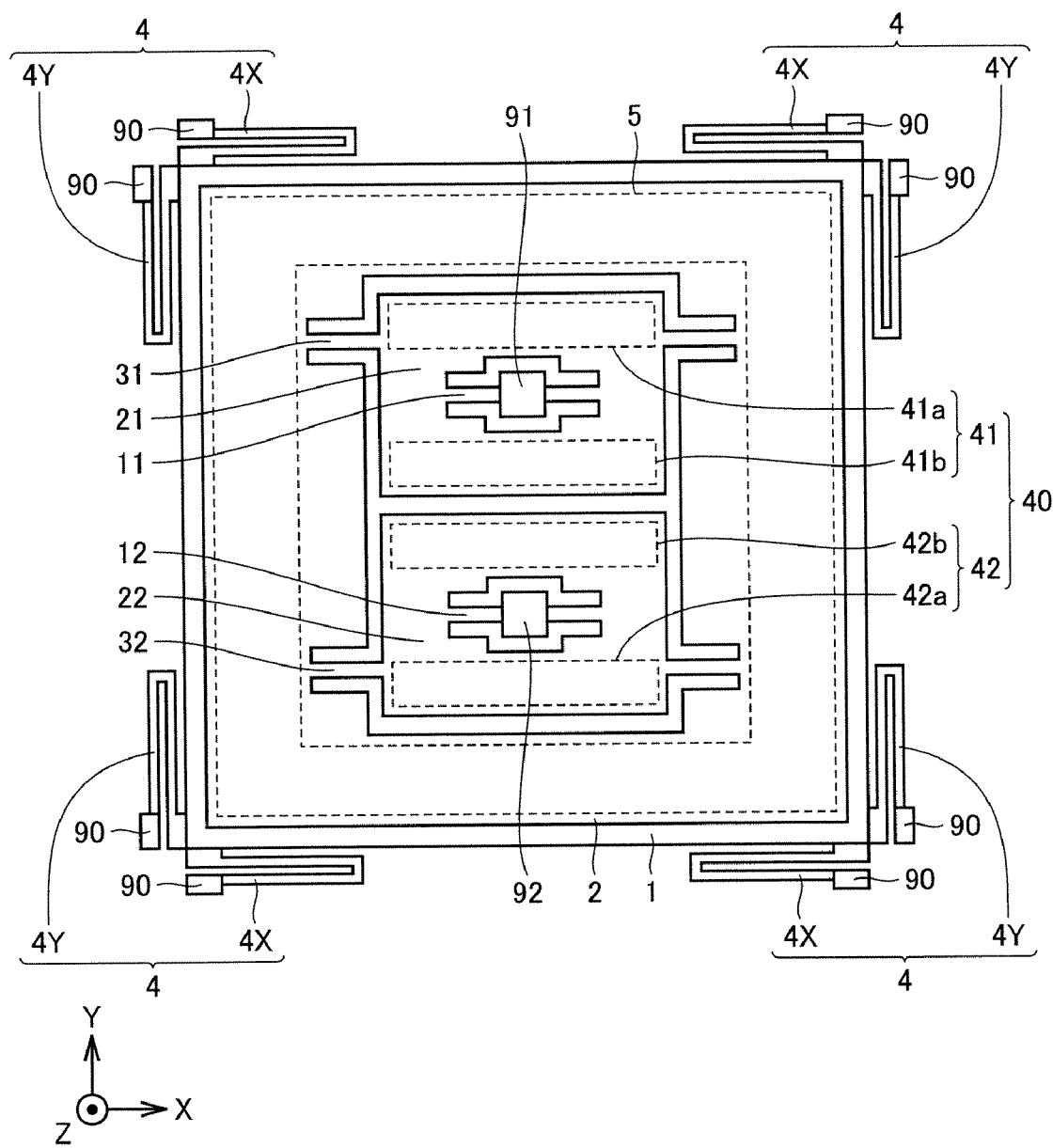
FIG. 16 is a top view schematically showing a constitution of an acceleration sensor according to Embodiment 3 of the present invention.

Referring to FIG. 16, an acceleration sensor according to the present embodiment includes anchors 90 on substrate 1 and supporting beams 4.

One end part of supporting beam 4 is supported above substrate 1 by anchor 90. Further, the other end part of supporting beam 4 supports inertia mass body 2.

Supporting beam 4 has a first supporting beam 4X and a second supporting beam 4Y. First supporting beam 4X has a shape which can be easily elastically deformed in the Z axis direction and hardly elastically deformed in the X axis direction. Second supporting beam 4Y has a shape which can be easily elastically deformed in the Z axis direction and hardly elastically deformed in the Y axis direction. For this reason, supporting beam 4 as a whole has a constitution which can be easily elastically deformed in the Z axis direction and hardly elastically deformed in the XY in-plane direction.

Note that since the constitution other than this part is the same as the above described constitution of Embodiment 1, the same components are denoted by the same reference numerals and characters, and the explanation of the components is omitted.

According to the present embodiment, inertia mass body 2 is supported above substrate 1 by supporting beam 4 which can be hardly elastically deformed in the XY in-plane direction. This enables the displacement of inertia mass body 2 to be suppressed, when acceleration (acceleration of other axis) in XY in-plane direction is applied to the acceleration sensor. As a result, the sensitivity (other axis sensitivity) to acceleration of other axis can be reduced.

Embodiment 4

Figure 17:
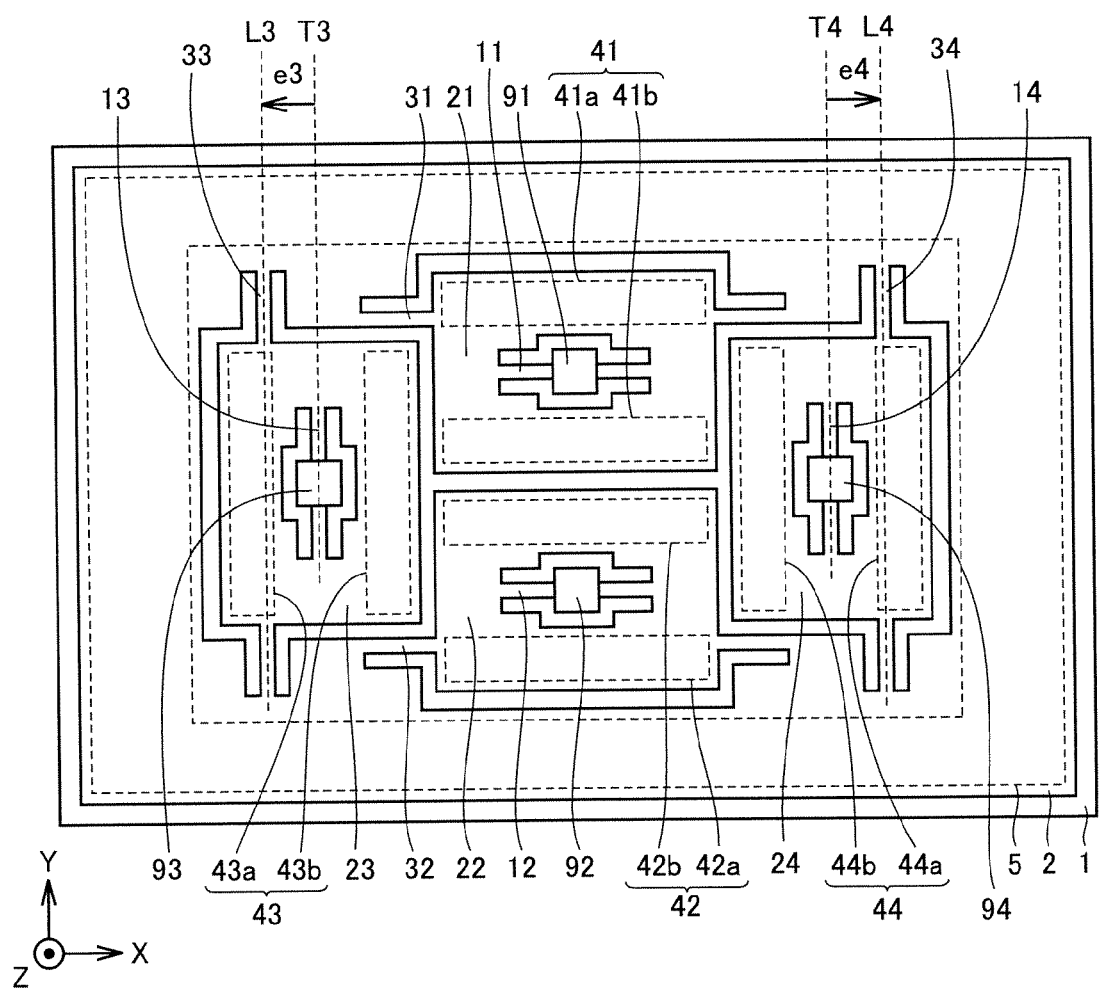
FIG. 17 is a top view schematically showing a constitution of an acceleration sensor according to Embodiment 4 of the present invention.

Referring to FIG. 17, an acceleration sensor according to the present embodiment further includes third and fourth torsion beams 13 and 14, third and fourth detection frames 23 and 24, a plurality of third and fourth detection electrodes 43 and 44, and third and fourth link beams 33 and 34, in addition to the constitution of the acceleration sensor of Embodiment 2.

Third torsion beam 13 is supported by substrate 1 with an anchor 93 so as to be distortionable around a third torsion axis T3 along the Y axis.

Third detection frame 23 is supported by substrate 1 with third torsion beam 13 so as to be rotatable about third torsion axis T3. Further, at least a part of third detection frame 23 has conductivity.

Fourth torsion beam 14 is supported by substrate 1 with an anchor 94 so as to be distortionable around a fourth torsion axis T4 along the Y axis.

Fourth detection frame 24 is supported by substrate 1 with fourth torsion beam 14 so as to be rotatable about fourth torsion axis T4. Further, at least a part of fourth detection frame 24 has conductivity.

The plurality of third detection electrodes 43 have third detection electrodes 43a and 43b facing third detection frame 23, in order to make it possible to detect an angle between third detection frame 23 and substrate 1. Further, the plurality of fourth detection electrodes 44 have fourth detection electrodes 44a and 44b facing fourth detection frame 24, in order to make it possible to detect an angle between fourth detection frame 24 and substrate 1.

Third link beam 33 is connected to third detection frame 23 on an axis L3 located at a position moved in parallel from a position of third torsion axis T3 by an offset e3 in a direction crossing third torsion axis T3 and directed to one end side of third detection frame 23. That is, the absolute value of offset e3 is a dimension between third torsion axis T3 and third link beam 33, and the direction of offset e3 is a direction crossing third torsion axis T3 and directed from third torsion axis T3 to axis L3.

Fourth link beam 34 is connected to fourth detection frame 24 on an axis L4 located at a position shifted in parallel from a position of fourth torsion axis T4 by an offset e4 in a direction opposite to the direction described above, that is, a direction opposite to the direction of offset e3. That is, the absolute value of offset e4 is a dimension between fourth torsion axis T4 and fourth link beam 34, and the direction of offset e4 is opposite to the direction of offset e3.

Inertia mass body 2 is supported above substrate 1 so as to be displaceable in the thickness direction of substrate 1 by being linked with third and fourth detection frames 23 and 24 by third and fourth link beams 33 and 34, respectively.

Third torsion beam 13, third detection frame 23, third link beam 33, and the plurality of third detection electrodes 43 may have the same shapes as those of first torsion beam 11, first detection frame 21, first link beam 31, and a plurality of first detection electrodes 41, the shapes being formed by rotating the latter shapes by 90° around the Z axis.

Further, fourth torsion beam 14, fourth detection frame 24, fourth link beam 34, and the plurality of fourth detection electrodes 44 may have the same shapes as those of second torsion beam 12, second detection frame 22, second link beam 32, and a plurality of second detection electrodes 42, the shapes being formed by rotating the latter shapes by 90° around the Z axis.

Note that since the constitution other than this part is the same as the above described constitution of Embodiment 2, the same components are denoted by the same reference numerals and characters, and the explanation of the components is omitted.

According to the present embodiment, third and fourth link beams 33 and 34 are formed along the Y axis direction (longitudinal direction in the figure) as shown in FIG. 17. This enables the displacement of inertia mass body 2 in the Y axis direction to be suppressed. Therefore, it is possible to suppress the measurement error caused when inertia mass body 2 is displaced in the Y axis direction (longitudinal direction in the figure) by acceleration in the Y axis direction applied to inertia mass body 2.

Embodiment 5

Figure 18:
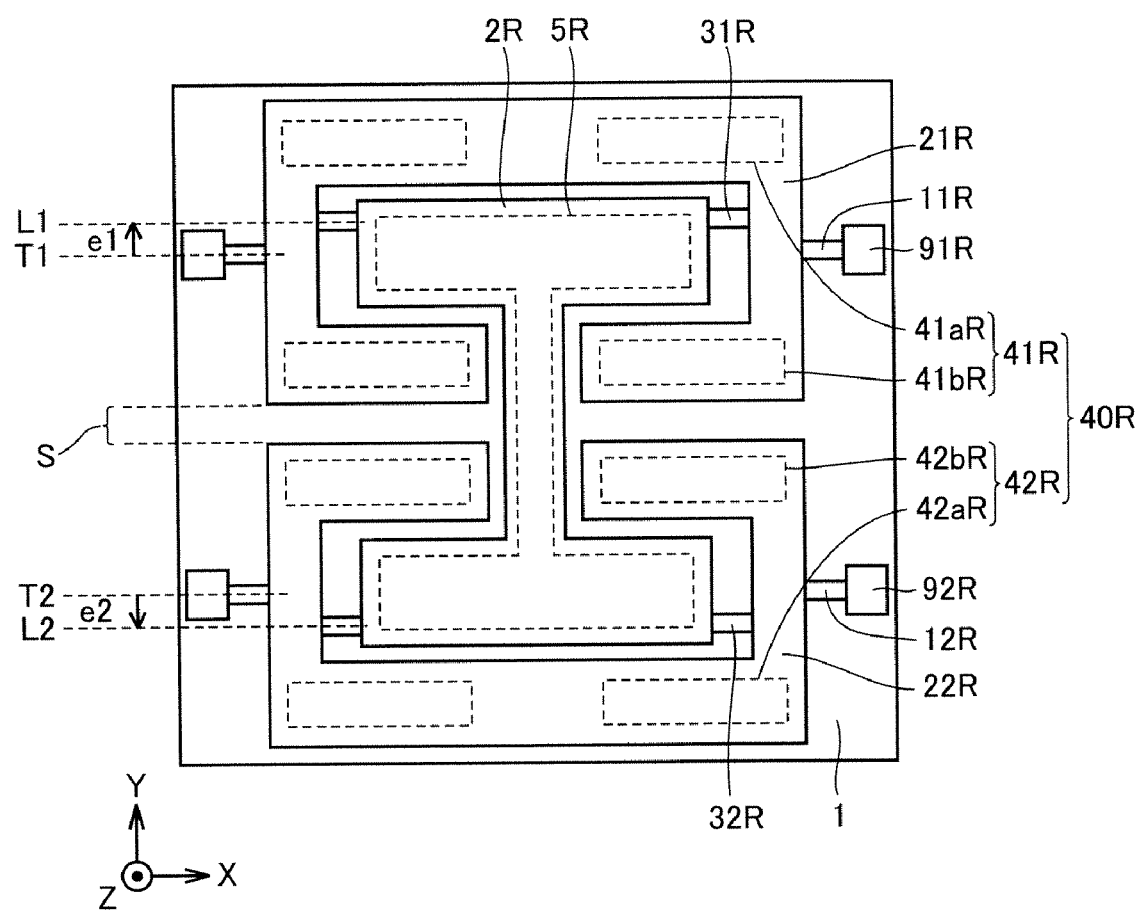
FIG. 18 is a top view schematically showing a constitution of an acceleration sensor according to Embodiment 5 of the present invention.

Referring to FIG. 14, in the above described acceleration sensor of Embodiment 2, inertia mass body 2 is arranged on the outer peripheral side of the acceleration sensor, and first and second detection frames 21 and 22 are arranged on the inner peripheral side. Referring to FIG. 18, an acceleration sensor according to the present embodiment is different from the acceleration sensor of Embodiment 2 in that first and second detection frames 21R and 22R are arranged on the outer peripheral side of the acceleration sensor, and inertia mass body 2R is arranged on the inner peripheral side.

In accordance with the difference in this arrangement, the arrangement of a detection electrode 40R and an actuation electrode 5R according to the present embodiment is also different from that of Embodiment 1. That is, in the acceleration sensor according to the present embodiment, detection electrode 40R is arranged on the outer peripheral side of substrate 1, and actuation electrode 5R is arranged on the inner peripheral side of detection electrode 40R.

Detection electrode 40R has first and second detection electrodes 41R and 42R facing first and second detection frames 21R and 22R, respectively. First detection electrode 41R has first detection electrodes 41aR and 41bR which are mutually separated by first torsion axis T1 in a plane layout. Second detection electrode 42R has second detection electrodes 42aR and 42bR which are mutually separated by second torsion axis T2 in the plane layout.

Note that first and second detection electrodes 41bR and 42bR are arranged on the central side of substrate 1, and first and second detection electrodes 41aR and 42aR are arranged on the peripheral side of substrate 1. Each of first and second detection electrodes 41bR and 42bR on the central side is formed so as to avoid the position directly under inertia mass body 2R. As a result, each of first and second detection electrodes 41bR and 42bR is divided into two regions. First and second detection electrodes 41aR and 42aR are arranged to have the same shapes as those of first and second detection electrode 41bR and 42bR.

Note that since the constitution other than this part is the same as the above described constitution of Embodiment 2, the same components are denoted by the same reference numerals and characters, and the explanation of the components is omitted.

According to the present embodiment, detection electrode 40R is provided on the outer peripheral side of inertia mass body 2R. Thereby, wiring from detection electrode 40R can be easily arranged without being passed under inertia mass body 2R. As a result, the parasitic capacitance between the wiring for detection electrode 40R and inertia mass body 2R can be suppressed, thereby enabling highly precise detection of acceleration az to be effected.

Further in the plane layout, an air gap S exists between first detection frame 21R and second detection frame 22R. Thereby, it is possible to prevent the parasitic capacitance from being formed between the wiring for actuation electrode 5R and first and second detection frames 21R and 22R by providing the wiring in the part of air gap S. As a result, it is possible to perform highly precise detection of acceleration.

Embodiment 6

Figure 19:
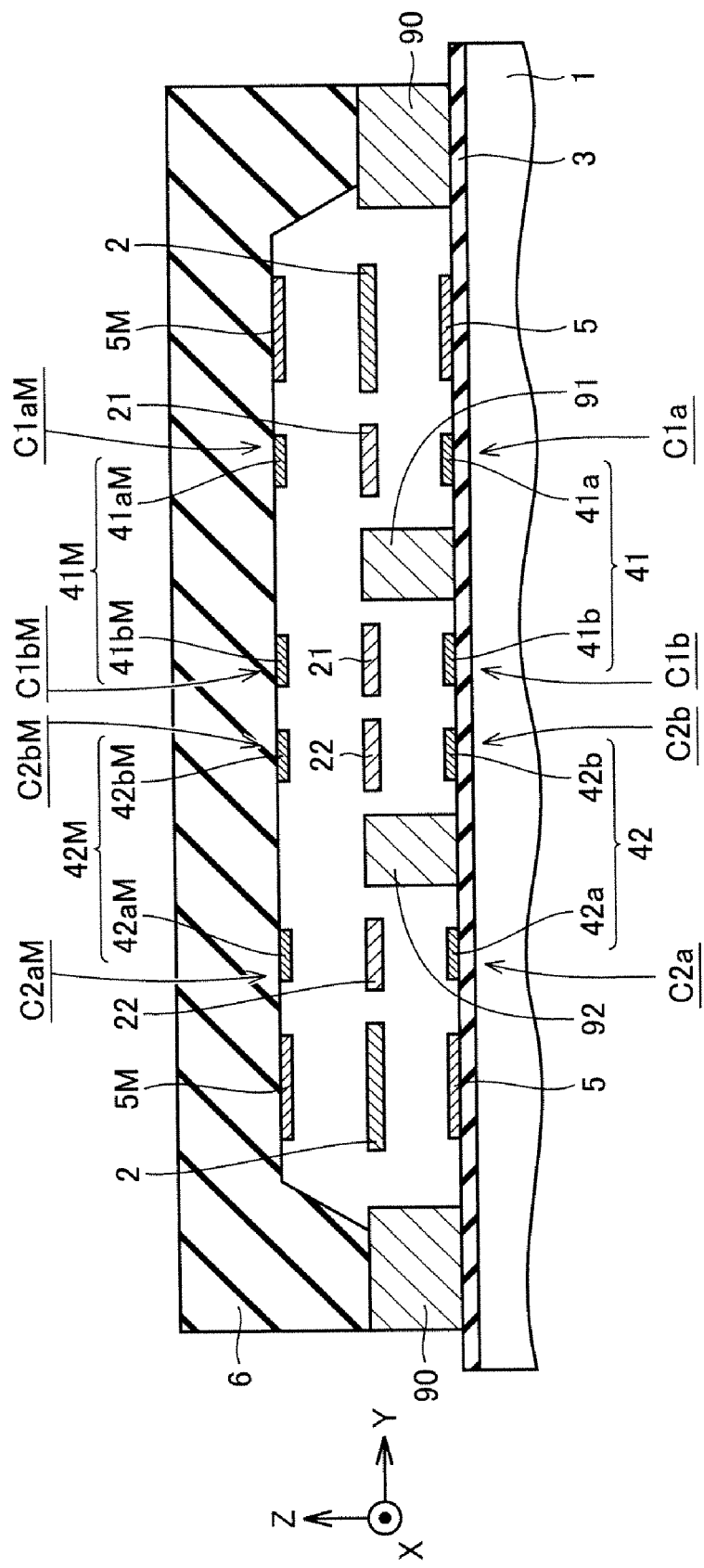
FIG. 19 is a top view schematically showing a constitution of an acceleration sensor according to Embodiment 6 of the present invention.

Referring to FIG. 19, an acceleration sensor according to the present embodiment further includes a cap 6, first and second detection electrodes 41M and 42M, and an anchor 90 in addition to the above described constitution of Embodiment 2.

Cap 6 is made of for example glass, and is supported above substrate 1 by anchor 90. As a joining method of cap 6, a method such as an anode joining method which enables firm joining is preferred. First and second detection frames 21 and 22 and inertia mass body 2, which are formed above substrate 1, are covered by cap 6.

Preferably, first and second detection frames 21 and 22 and inertia mass body 2 are sealed by cap 6 above substrate 1.

First and second detection electrodes 41M and 42M are formed on the back surface side (the side facing substrate 1) of cap 6 so as to face first and second detection frames 21 and 22, respectively. First detection electrode 41M has a first detection electrode 41aM provided above first detection electrode 41a, and a first detection electrode 41bM provided above first detection electrode 41b. Second detection electrode 42M has a second detection electrode 42aM provided above second detection electrode 42a, and a second detection electrode 42bM provided above second detection electrode 42b.

A capacitor C1aM is formed by making first detection electrode 41aM face first detection frame 21. Further, a capacitor C1bM is formed by making first detection electrode 41bM face first detection frame 21. Further, a capacitor C2aM is formed by making second detection electrode 42aM face second detection frame 22. Further, a capacitor C2bM is formed by making second detection electrode 42bM face second detection frame 22.

Figure 20:
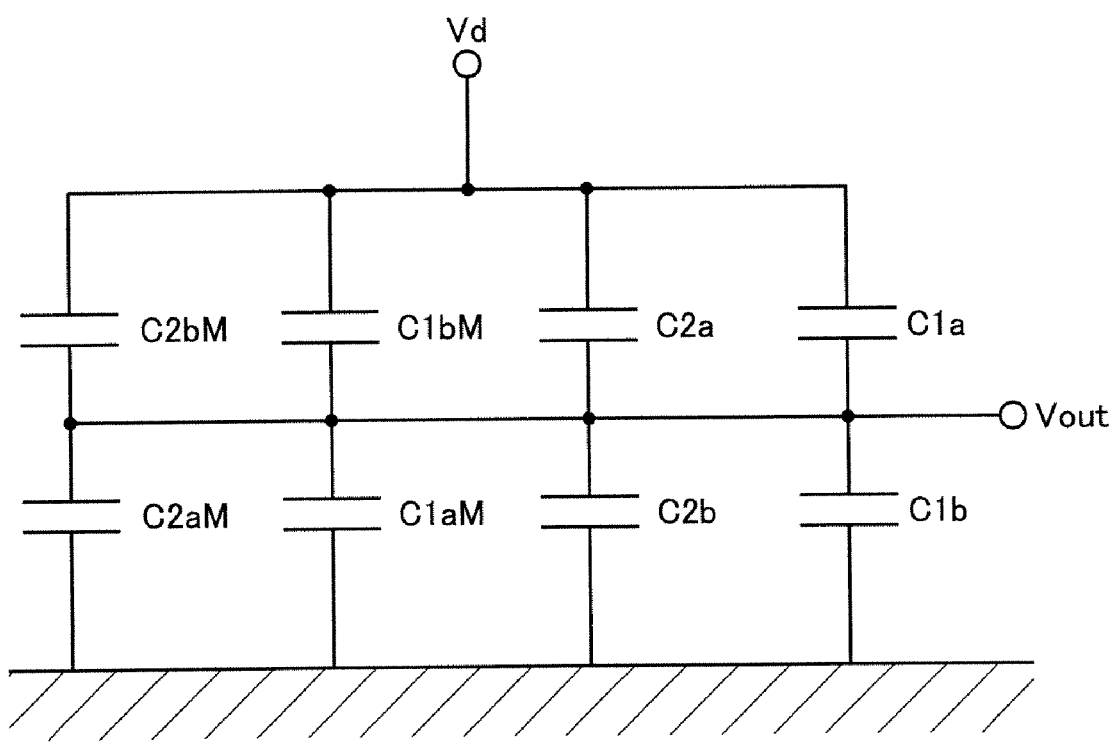
FIG. 20 is a circuit diagram explaining an electrical connection between capacitors formed by first and second detection frames and detection electrodes of the acceleration sensor according to Embodiment 6 of the present invention.

The above described capacitors and capacitors C1a, C1b, C2a and C2b explained in Embodiment 1 constitute an electrical circuit shown in FIG. 20.

Note that since the constitution of the present embodiment other than this part is the same as the above described constitution of Embodiment 2, the same components are denoted by the same reference numerals and character, and the explanation of the components is omitted.

According to the present embodiment, as shown in FIG. 19, a structural body part (part of first and second detection frames 21 and 22 and inertia mass body 2) of the acceleration sensor is covered by cap 6 and preferably sealed. This makes it possible to prevent impurities such as dust and water drops from entering into the structural body part. As a result, it is possible to improve environmental resistance of the acceleration sensor.

First and second detection electrodes 41M and 42M are also formed on cap 6 in addition to first and second detection electrodes 41 and 42 on substrate 1. This enables, as shown in FIG. 20, the electrostatic capacitance between the detection terminal of output potential $V_{out}$ and the grounding part, and the electrostatic capacitance between the terminal to which constant potential $V_d$ is applied and the grounding part can be substantially doubled as compared with the case of Embodiment 2. This makes it possible to improve the detection sensitivity of the acceleration sensor.

Note that in the explanation of each of the above described embodiments, the surface processing type acceleration sensor formed on a silicon substrate by using, for example, a polysilicon film and the like was explained. However, the present invention is not limited to these, but may also be applied to a bulk type acceleration sensor.

In the case of the bulk type acceleration sensor, it is possible to use a glass substrate as substrate 1. Further, an electrode made of a metal thin film, such as Au (gold) thin film formed on a Cr (chromium) underlayer, can be used as detection electrodes 41, 42, 43 and 44. Further, detection frames 21, 22, 23, 24 and the like can be formed of single crystal silicon.

Embodiment 7

Embodiments 1 to 6 have been described under an approximation that first and second torsion beams 11 and 12 are ideal torsion beams and do not undergo displacement other than torsional displacement. Strictly speaking, first and second torsion beams 11 and 12 generally undergo cantilever-like displacement in addition to torsional displacement. Specifically, a portion of first torsion beam 11 adjacent to first detection frame 21 is displaced in the Z axis direction, with a portion thereof adjacent to anchor 91 serving as a fixed point, and a portion of second torsion beam 12 adjacent to second detection frame 22 is displaced in the Z axis direction, with a portion thereof adjacent to anchor 92 serving as a fixed point. In Embodiments 7 to 9, description will be given taking the above cantilever-like displacement of first and second torsion beams 11 and 12 into consideration.

Figure 21:
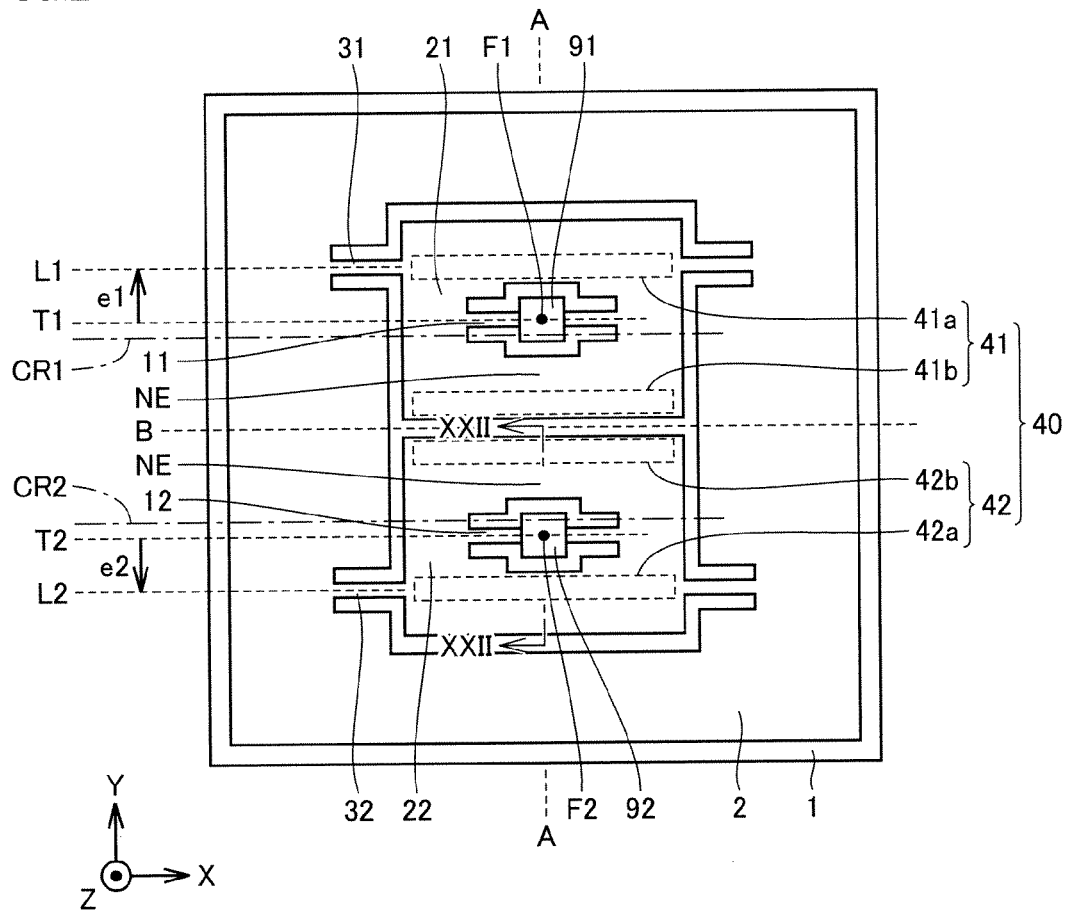
FIG. 21 is a top view schematically showing a constitution of an acceleration sensor according to Embodiment 7 of the present invention.
Figure 22:
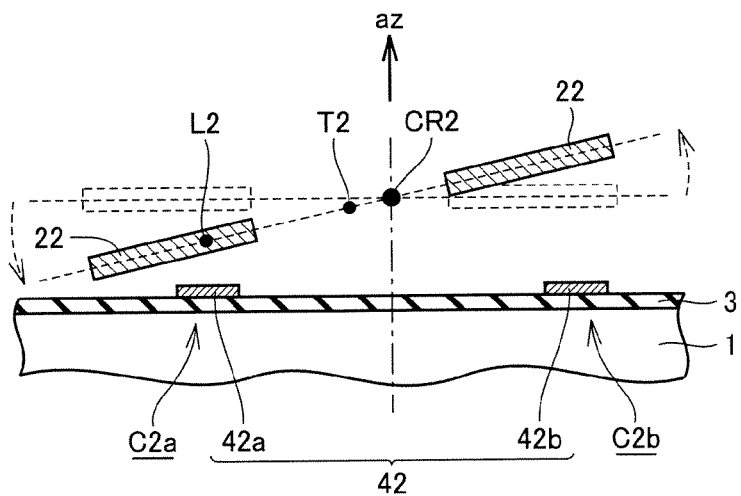
FIG. 22 is a partial cross-sectional view which schematically shows a state where acceleration is applied upward along the film thickness direction of the substrate to the acceleration sensor according to Embodiment 7 of the present invention, and whose cross-sectional position corresponds to the position along line XXII-XXII in FIG. 21, and in which anchors are not shown for the sake of clarity, and the position of a second torsion axis in the Z axis direction corresponds to cantilever-like displacement of a second torsion beam.

Referring to FIGS. 21 and 22, as a result of the cantilever-like displacement of first torsion beam 11 in accordance with change in acceleration az, a first rotation axis CR1, which is an axis of rotation of first detection frame 21, is located to be shifted from first torsion axis T1. Similarly, a second rotation axis CR2, which is an axis of rotation of second detection frame 22, is located to be shifted from second torsion axis T2.

Figure 23:
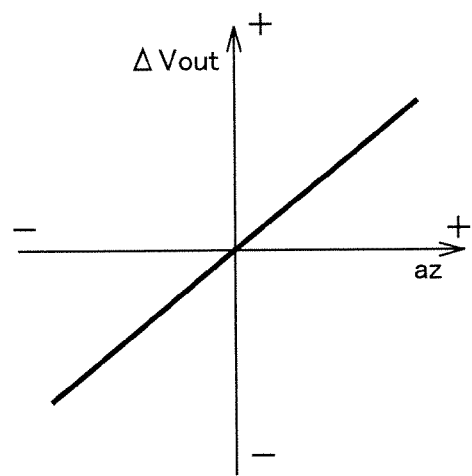
FIG. 23 is a graph schematically showing relationship between output potential and acceleration of the acceleration sensor according to Embodiment 7 of the present invention.

First detection electrodes 41a and 41b are provided symmetrically with each other with respect to first rotation axis CR1 when seen in plane (when seen in the same direction as FIG. 21). Second detection electrodes 42a and 42b are provided symmetrically with each other with respect to second rotation axis CR2 when seen in plane. Because of this symmetry, as to output change $\Delta V_{out}$ of output potential $V_{out}$, symmetry between the graph of output change $\Delta V_{out}$ in a region having positive acceleration az and the graph of output change $\Delta V_{out}$ in a region having negative acceleration az is improved, as shown in FIG. 23.

Note that since the constitution of the present embodiment other than this part is the same as the above described constitution of Embodiment 1, the same components are denoted by the same reference numerals and characters, and the explanation of the components is omitted.

Next, a constitution of an acceleration sensor according to a comparative example of the present embodiment will be described.

Figure 24:
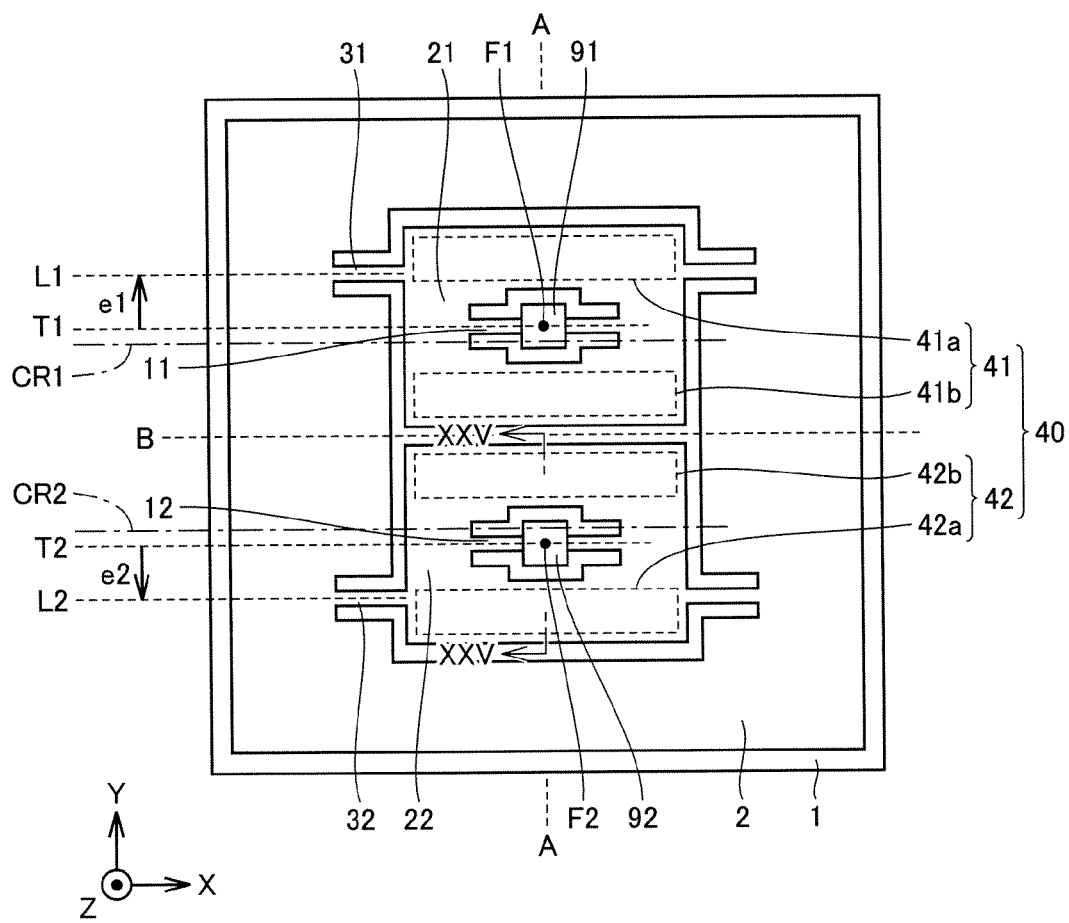
FIG. 24 is a top view schematically showing a constitution of an acceleration sensor according to a comparative example of Embodiment 7 of the present invention.
Figure 25:
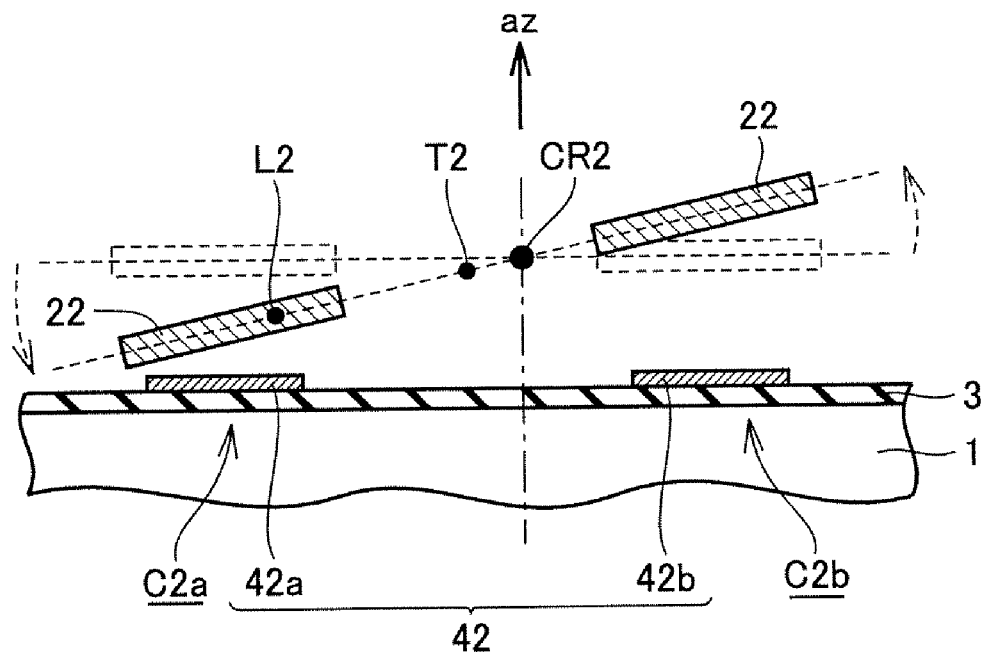
FIG. 25 is a partial cross-sectional view which schematically shows a state where acceleration is applied upward along the film thickness direction of the substrate to the acceleration sensor according to the comparative example of Embodiment 7 of the present invention, and whose cross-sectional position corresponds to the position along line XXV-XXV in FIG. 24, and in which anchors are not shown for the sake of clarity, and the position of a second torsion axis in the Z axis direction corresponds to cantilever-like displacement of a second torsion beam.
Figure 26:
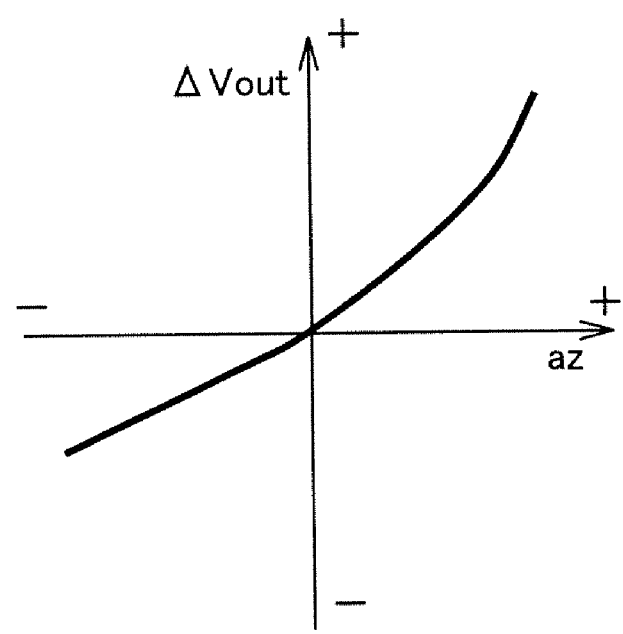
FIG. 26 is a graph schematically showing relationship between output potential and acceleration of the acceleration sensor according to the comparative example of Embodiment 7 of the present invention.

Referring to FIGS. 24 and 25, first detection electrodes 41a and 41b in the present comparative example are provided symmetrically with each other with respect to first torsion axis T1 when seen in plane (when seen in the same direction as FIG. 24). Second detection electrodes 42a and 42b are provided symmetrically with each other with respect to second torsion axis T2 when seen in plane. Herein, second torsion axis T2 is shifted in position from second rotation axis CR2. Accordingly, second detection electrodes 42a and 42b are asymmetrical with each other with respect to second rotation axis CR2 when seen in plane. Similarly, first detection electrodes 41a and 41b are asymmetrical with each other with respect to first rotation axis CR1 when seen in plane. Because of this asymmetry, as to output change $\Delta V_{out}$ of output potential $V_{out}$, symmetry between the graph of output change $\Delta V_{out}$ in a region having positive acceleration az and the graph of output change $\Delta V_{out}$ in a region having negative acceleration az is deteriorated, as shown in FIG. 26.

According to the present embodiment, first detection electrode 41 is provided symmetrically with respect to first rotation axis CR1 and second detection electrode 42 is provided symmetrically with respect to second rotation axis CR2 when seen in plane, as shown in FIGS. 21 and 22. Thereby, output change $\Delta V_{out}$ having improved symmetry between a region having positive acceleration and a region having negative acceleration as shown in FIG. 23 can be obtained.

Embodiment 8

Embodiment 7 has been described under an approximation that first and second rotation axes CR1 and CR2 are located at fixed positions. Strictly speaking, the positions of first and second rotation axes CR1 and CR2 have frequency dependence with respect to acceleration. In the present embodiment, description will be given taking the above frequency dependence into consideration.

Figure 27:
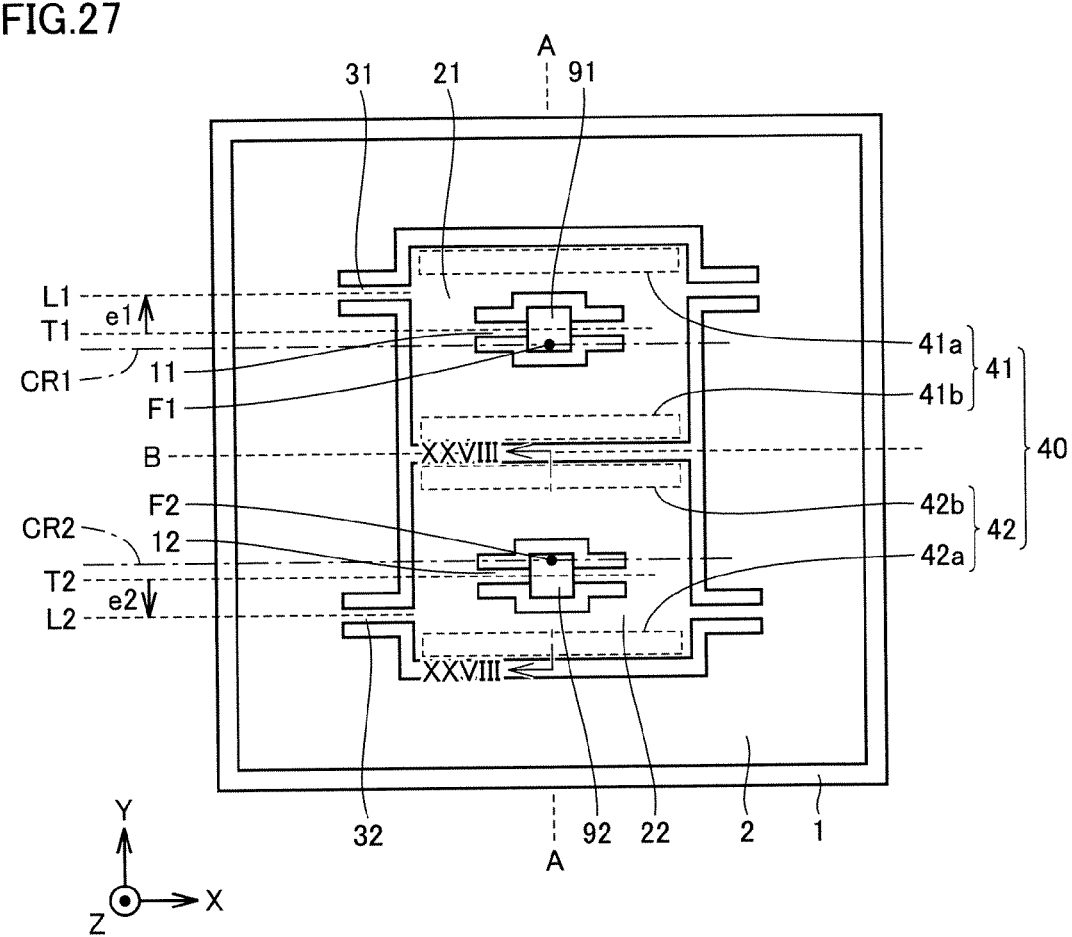
FIG. 27 is a top view schematically showing a constitution of an acceleration sensor according to Embodiment 8 of the present invention.
Figure 28:
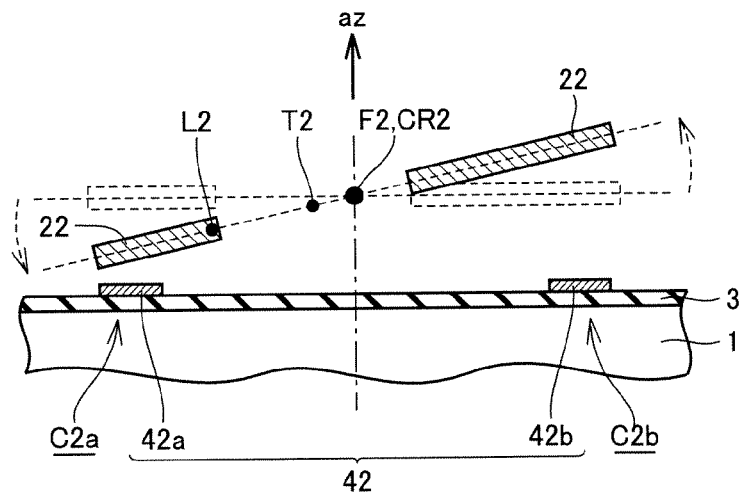
FIG. 28 is a partial cross-sectional view which schematically shows a state where acceleration is applied upward along the film thickness direction of the substrate to the acceleration sensor according to Embodiment 8 of the present invention, and whose cross-sectional position corresponds to the position along line XXVIII-XXVIII in FIG. 27, and in which anchors are not shown for the sake of clarity, and the position of a second torsion axis in the Z axis direction corresponds to cantilever-like displacement of a second torsion beam.

Referring to FIGS. 27 and 28, a center FT of gravity of first detection frame 21 of an acceleration sensor according to the present embodiment is located on first rotation axis CR1. A center F2 of gravity of second detection frame 22 is located on second rotation axis CR2.

Note that since the constitution of the present embodiment other than this part is the same as the above described constitution of Embodiment 7, the same components are denoted by the same reference numerals and characters, and the explanation of the components is omitted.

According to the present embodiment, the centers of gravity of first and second detection frames 21 and 22 are located on first and second rotation axes CR1 and CR2, respectively. This can suppress the frequency dependence of the positions of first and second rotation axes CR1 and CR2. Therefore, the acceleration sensor according to the present embodiment can stably have the effect described in Embodiment 7 over a wide frequency range.

Embodiment 9

Figure 29:
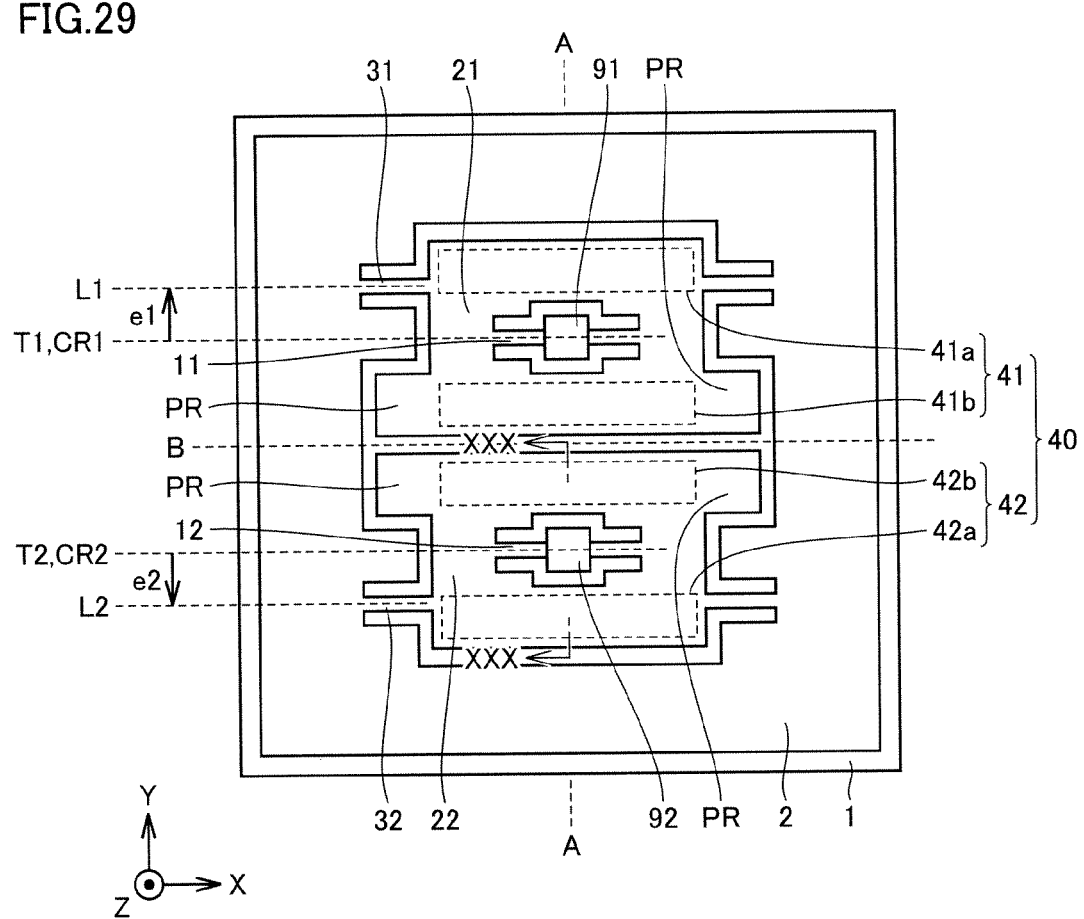
FIG. 29 is a top view schematically showing a constitution of an acceleration sensor according to Embodiment 9 of the present invention.
Figure 30:
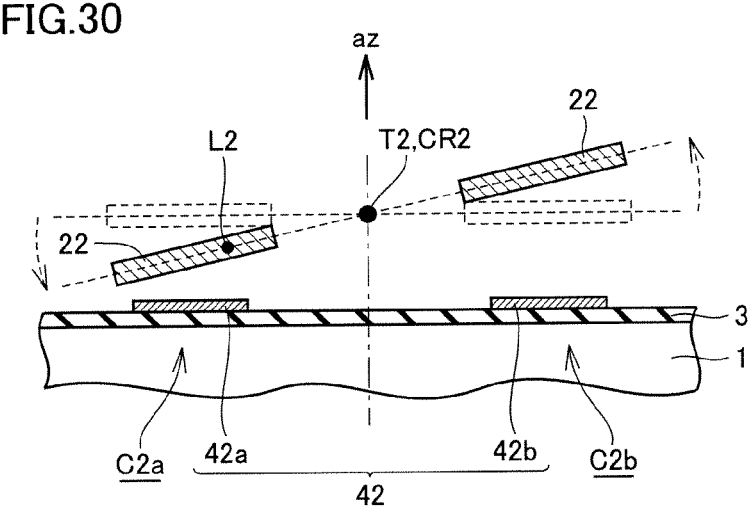
FIG. 30 is a partial cross-sectional view which schematically shows a state where acceleration is applied upward along the film thickness direction of the substrate to the acceleration sensor according to Embodiment 9 of the present invention, and whose cross-sectional position corresponds to the position along line XXX-XXX in FIG. 29, and in which anchors are not shown for the sake of clarity.

Referring to FIGS. 29 and 30, first and second torsion axes T1 and T2 of an acceleration sensor according to the present embodiment are first and second rotation axes CR1 and CR2, respectively.

Note that since the constitution of the present embodiment other than this part is the same as the above described constitution of Embodiment 7, the same components are denoted by the same reference numerals and characters, and the explanation of the components is omitted.

According to the present embodiment, first detection electrode 41 is provided symmetrically with respect to first torsion axis T1 and second detection electrode 42 is provided symmetrically with respect to second torsion axis T2 when seen in plane. Thereby, first detection electrode 41 can be provided symmetrically with respect to first rotation axis CR1 and second detection electrode 42 can be provided symmetrically with respect to second rotation axis CR2 when seen in plane. Accordingly, first detection electrode 41 having a large area can be provided on both sides of first torsion axis T1 to sandwich the axis when seen in plane, and second detection electrode 42 having a large area can be provided on both sides of second torsion axis T2 to sandwich the axis when seen in plane. Thereby, capacitors C1a, C1b, C2a, and C2b can have increased electrostatic capacitance, and thus a rate of change in electrostatic capacitance can be detected accurately. Consequently, rotational angles of first and second detection frames 21 and 22 can be detected accurately, and thus acceleration can be detected accurately.

Note that, unlike the present embodiment, in the constitution shown in FIG. 21 (Embodiment 7), first and second torsion axes T1 and T2 are shifted from first and second rotation axes CR1 and CR2, respectively. In this case, to maintain the symmetry described in Embodiment 7, detection electrode 40 cannot be disposed in a region NE (FIG. 21) located on a side of first and second torsion axes T1 and T2 adjacent to first and second rotation axes CR1 and CR2, respectively. Therefore, compared with the present embodiment, it is difficult to increase electrostatic capacitance of capacitors C1a, C1b, C2a, and C2b.

Each of the embodiments disclosed herein is to be regarded as illustrative in all respects, and not as restrictive. The scope of the present invention is indicated not by the above described explanation but by the appended claims, and is intended to include all changes and modifications within the meaning and range of equivalents of the appended claims.

What is claimed is:

1. An acceleration sensor comprising:
a substrate;
a first torsion beam supported by the substrate to be distorted around a first torsion axis;
a first detection frame supported by the substrate with the first torsion beam so as to be rotatable about the first torsion axis;
a second torsion beam supported by the substrate to be distorted around a second torsion axis;
a second detection frame supported by the substrate with the second torsion beam so as to be rotatable about the second torsion axis;
a plurality of detection electrodes formed on the substrate so as to face each of the first and second detection frames, for detecting an angle formed between the substrate and each of the first and second detection frames on the basis of electrostatic capacitance;
a first link beam connected to the first detection frame on an axis located at a position moved from a position of the first torsion axis in a first direction crossing the first torsion axis and directed to one end side of the first detection frame;
a second link beam connected to the second detection frame on an axis located at a position shifted from a position of the second torsion axis in a second direction opposite to the first direction; and
an inertia mass body supported above the substrate to be displaceable in a thickness direction of the substrate, by being linked with the first and second detection frames by the first and second link beams, respectively.

2. The acceleration sensor according to claim 1, wherein a dimension between the first torsion axis and the first link beam is equal to a dimension between the second torsion axis and the second link beam.

3. The acceleration sensor according to claim 1, wherein the first and second torsion axes are in parallel with each other.

4. The acceleration sensor according to claim 1, further comprising a supporting beam for supporting the inertia mass body above the substrate to enable the inertia mass body to be elastically displaceable in the thickness direction of the substrate.

5. The acceleration sensor according to claim 1, further comprising a cap covering the first and second detection frames.

6. The acceleration sensor according to claim 1, wherein the inertia mass body has a conductive part, and further comprising an electrode for electrostatically driving the inertia mass body in the thickness direction of the substrate, on the substrate under the conductive part.

7. The acceleration sensor according to claim 1, wherein the plurality of detection electrodes includes:
a plurality of first detection electrodes formed on the substrate so as to face the first detection frame, for detecting an angle formed between the substrate and the first detection frame on the basis of electrostatic capacitance; and
a plurality of second detection electrodes formed on the substrate so as to face the second detection frame, for detecting an angle formed between the substrate and the second detection frame on the basis of electrostatic capacitance, and
the plurality of first detection electrodes are provided symmetrically with respect to an axis of rotation of the first detection frame when seen in plane, and the plurality of second detection electrodes are provided symmetrically with respect to an axis of rotation of the second detection frame when seen in plane.

8. The acceleration sensor according to claim 7, wherein centers of gravity of the first and second detection frames are located on the axes of rotation of the first and second detection frames, respectively.

9. The acceleration sensor according to claim 7, wherein the first and second torsion axes are the axes of rotation of the first and second detection frames, respectively.

* * * * *